US008668033B2

(12) United States Patent
Koike et al.

(10) Patent No.: US 8,668,033 B2
(45) Date of Patent: Mar. 11, 2014

(54) WORK VEHICLE

(75) Inventors: Kazuo Koike, Kobe (JP); Hirokazu Ito, Izumisano (JP)

(73) Assignee: Kubota Corporation, Osaka (JP)

( * ) Notice: Subject to any disclaimer, the term of this patent is extended or adjusted under 35 U.S.C. 154(b) by 77 days.

(21) Appl. No.: 13/242,079

(22) Filed: Sep. 23, 2011

(65) Prior Publication Data
US 2012/0238403 A1 Sep. 20, 2012

(30) Foreign Application Priority Data

Mar. 14, 2011 (JP) .................................. 2011-55806

(51) Int. Cl.
*B62D 11/02* (2006.01)
*G06F 7/00* (2006.01)

(52) U.S. Cl.
USPC ........................................... 180/6.48; 701/41

(58) Field of Classification Search
USPC .............. 180/6.28, 6.48, 6.5, 333; 701/22, 41
See application file for complete search history.

(56) References Cited

U.S. PATENT DOCUMENTS

| 4,955,344 | A | * | 9/1990 | Tatsumi et al. | 123/352 |
|---|---|---|---|---|---|
| 6,863,144 | B2 | * | 3/2005 | Brandt et al. | 180/333 |
| 8,469,137 | B2 | | 6/2013 | Fujii | |
| 2002/0153188 | A1 | * | 10/2002 | Brandt et al. | 180/252 |
| 2009/0000839 | A1 | | 1/2009 | Ishii et al. | |
| 2009/0201650 | A1 | * | 8/2009 | Hauser et al. | 361/736 |
| 2011/0127093 | A1 | * | 6/2011 | Koga et al. | 180/6.24 |
| 2011/0259012 | A1 | | 10/2011 | Tada et al. | |
| 2012/0095636 | A1 | * | 4/2012 | Ishii et al. | 701/22 |
| 2012/0159916 | A1 | * | 6/2012 | Ishii et al. | 56/10.2 A |
| 2012/0307863 | A1 | | 12/2012 | Tada et al. | |
| 2013/0047567 | A1 | | 2/2013 | Minoura et al. | |
| 2013/0048406 | A1 | | 2/2013 | Kuramoto | |
| 2013/0048445 | A1 | | 2/2013 | Kuramoto et al. | |

FOREIGN PATENT DOCUMENTS

| JP | 2006-082767 | 3/2006 |
|---|---|---|
| JP | 2008-168870 | 7/2008 |

OTHER PUBLICATIONS

U.S. Appl. No. 13/046,278 to Akira Minoura et al., filed Mar. 11, 2011.
U.S. Appl. No. 13/241,981 to Kazuo Koike et al., filed Sep. 23, 2011.
U.S. Appl. No. 13/242,013 to Kazuo Koike et al., filed Sep. 23, 2011.
U.S. Appl. No. 13/242,041 to Hiroyuki Tada et al., filed Sep. 23, 2011.
Office Action issued in counterpart Japanese application 2011-055806 dated Nov. 14, 2013.

* cited by examiner

*Primary Examiner* — Paul N Dickson
*Assistant Examiner* — Daniel Yeagley
(74) *Attorney, Agent, or Firm* — Greenblum & Bernstein, P.L.C.

(57) ABSTRACT

A work vehicle includes a pair of electric motors independently running and driving right and left running wheels in a state of being able to create straight running state and turning running; a pair of right and left change speed operation tools independently manually operated and performing a change speed operation to the right and left running wheels; and a controller controlling operation. The controller controls the operation of the respective electric motors by setting target speeds with regard to the respective electric motors such that the speed difference in the target speeds is smaller than the speed difference corresponding to the difference in the operation positions of the respective change speed operation tools by a set amount in a case where the operation positions of the respective change speed operation tools are different between right and left.

9 Claims, 16 Drawing Sheets

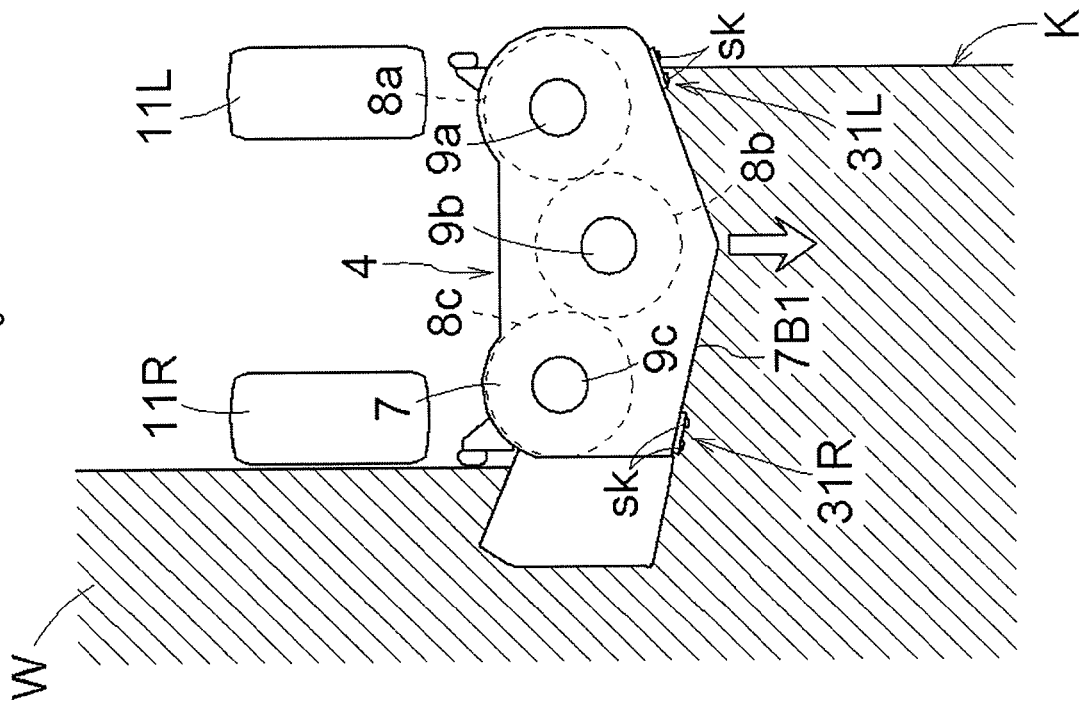
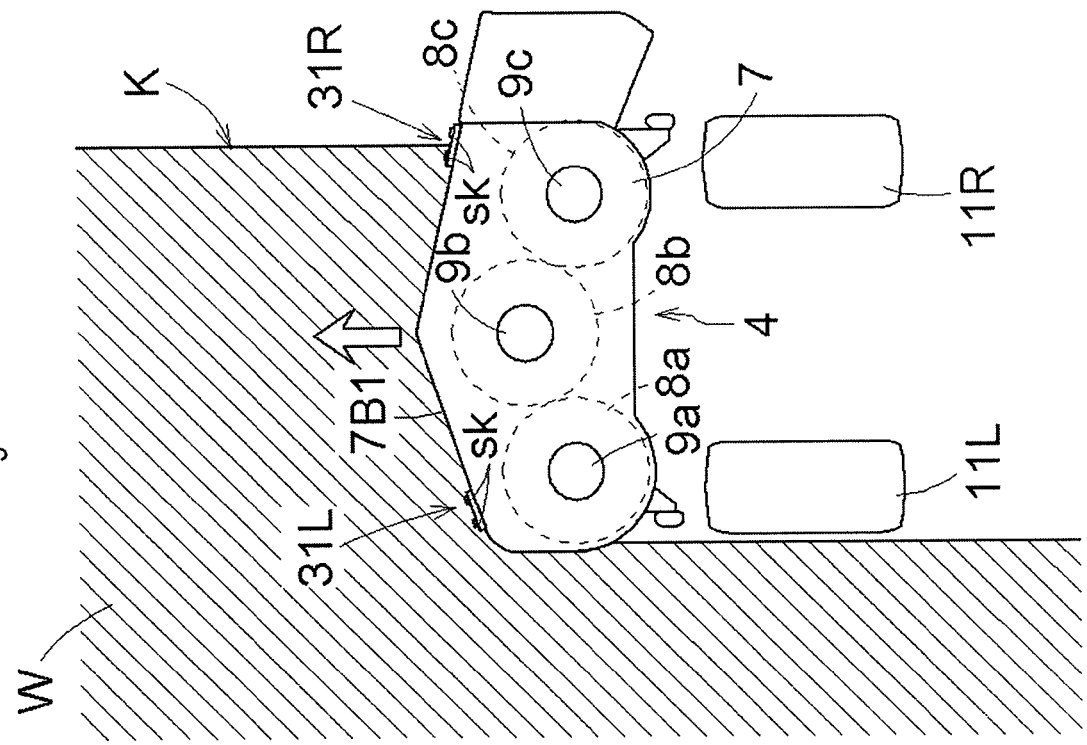

WORK VEHICLE

CROSS-REFERENCE TO RELATED APPLICATIONS

The present application claims priority under 35 U.S.C. §119 of Japanese Application No. 2011-055806, filed on Mar. 14, 2011, which is herein expressly incorporated by reference in its entirety.

BACKGROUND OF THE INVENTION

1. Field of the Invention

The present invention relates to a work vehicle that includes a pair of electric motors independently running and driving right and left running wheels in a state of being able to cause a straight running state and a turning running state; a pair of right and left change speed operation tools independently manually operated and performing a change speed operation to the right and left running wheels; a pair of change speed operation position detectors detecting an operation position of the respective change speed operation tools; and a controller controlling operation of the respective electric motors by setting target speeds with regard to the respective electric motors based on detection information of the respective change speed operation position detectors.

2. Description of Related Art

Conventionally, in the work vehicle having such a structure, when a change speed operation is performed to the right and left running wheels by the pair of right and left change speed operation tools, the operation of the respective electric motors is controlled by setting a target speed obtained from the operation position of the change speed operation tools as is (see Related Art 1).

[Related Art 1] Japanese Patent Laid-Open Publication No. 2008-168870

By performing a change speed operation to the right and left running wheels with the pair of right and left change speed operation tools, the work vehicle having such a structure can perform turning running in the forward and backward directions including turning running with a small turn such as a spin turn by driving the right and left running wheels in the reverse direction with respect to each other as well as running forward and running backward. The work vehicle can thus be preferably used for a mower and the like.

In such a structure, however, the operation of the respective electric motors is controlled by setting a target speed obtained from the operation position of the pair of right and left change speed operation tools as is. Consequently, there are disadvantages as follows:

For example, in a case of running straight in a forward direction, a driver manually operates the pair of right and left change speed operation tools for the same amount in the same direction for straight running so as to drive the right and left electric motors at the same speed in the forward direction. When the driver operates the change speed operation tools separately by the right and left hands, however, it is difficult to operate the operation positions on the right and left sides in the same position. It also happens that the change speed operation tools is swayed by shaking and the like of the vehicle body while running the work vehicle. There is thus a strong likelihood that the target speeds of the right and left electric motors will be slightly different.

In a case of running in a state where the target speeds of the right and left electric motors are different, the electric motor corresponding to the running wheel on the high-speed side tries to drive the running wheel by outputting driving force for straight running to achieve the target speed in accordance with the operation position commanded by the corresponding change speed operation tool. On the other hand, since the speed of the running wheel on the low-speed side is lower than the speed of the running wheel on the high-speed side, the running wheel on the low-speed side rotates under the influence of the driving force of the running wheel on the high-speed side, and thereby tries to rotate at a higher speed than the target speed in accordance with the operation position commanded by the change speed operation tool.

In such a case, the electric motor that drives the running wheel on the low-speed side generates torque of a reverse direction to control and adjust the speed to be its own target speed. On the other hand, since the running wheel on the high-speed side rotates under the influence of the driving force of the running wheel on the low-speed side, and thereby tries to rotate at a lower speed than the target speed in accordance with the operation position commanded by the change speed operation tool, the electric motor that drives the running wheel on the high-speed side generates torque to accelerate and adjust the speed to be its own target speed.

As a result, the difference in the actual running speed between the right and left running wheels becomes greater than the difference in the target speed in accordance with the operation positions commanded by the corresponding change speed operation tools, and the vehicle body of the work vehicle becomes more inclined on the either side of right and left from the straight moving state. The driver then tries to operate the change speed operation tool of the running wheel on the low-speed side toward the high-speed side and operate the change speed operation tool of the running wheel on the high-speed side toward the low-speed side so as to correct the balance. However, the running wheel on the low-speed side and the running wheel on the high-speed side become opposite with regard to right and left, and a similar state of rotating under the influence of the other occurs. Consequently, the difference in the speed between the right and left running wheels becomes greater than the difference in the target speed in accordance with the operation position commanded by the corresponding change speed operation tools, and the vehicle body of the work vehicle becomes more inclined on the either side of right and left from the straight moving state.

Specifically, a state of rotating under the influence of the other occurs repeatedly while reversing right and left, which results in hunting and deterioration in the running stability.

SUMMARY OF THE INVENTION

An advantage of the present invention is to provide a work vehicle to improve the running stability while independently running and driving right and left running wheels by a pair of electric motors, and performing a change speed operation to the right and left running wheels independently.

A work vehicle of the present invention includes a pair of electric motors independently running and driving right and left running wheels in a state of being able to cause a straight running state and a turning running state; a pair of right and left change speed operation tools independently manually operated and performing a change speed operation to the right and left running wheels; a pair of change speed operation position detectors detecting operation positions of the respective change speed operation tools; and a controller controlling operation of the respective electric motors by setting target speeds with regard to the respective electric motors based on detection information of the respective change speed operation position detectors. According to a first aspect of the present invention, the controller controls the operation of the respective electric motors by setting target speeds with regard to the respective electric motors such that the speed difference in the target speeds is smaller than the speed difference corresponding to the difference in the operation positions of the respective change speed operation tools by a set amount in a case where the operation positions of the respective change speed operation tools are different between right and left.

According to the first aspect of the present invention, when the pair of right and left change speed operation tools are independently manually operated, the operation positions of the respective change speed operation tools are detected by the respective change speed operation position detectors. The controller sets target speeds with regard to the respective electric motors based on detection information of the respective change speed operation position detectors. In a case where the operation positions of the respective change speed operation tools are different between right and left, it is arranged that the speed difference in the target speeds is smaller than the speed difference corresponding to the difference in the operation positions of the respective change speed operation tools by a set amount. The controller then controls the operation of the respective electric motors to adjust the speeds of the running wheels to be the set target speeds.

As a result, for example, in a case where a driver manually operates the pair of right and left change speed operation tools for the same amount in the same direction for straight running so as to drive the right and left electric motors at the same speed in the forward direction, even when the driver operates the change speed operation tools separately by the right and left hands, and the operation positions on the right and left sides are not in the same position, the right and left electric motors are close to be the same speed by causing the speed difference in the target speeds to be smaller than the speed difference corresponding to the difference in the operation positions of the respective change speed operation tools by a set amount.

Specifically, by causing the actual speed difference between the running wheels to be smaller than the speed difference corresponding to the difference in the operation positions of the respective change speed operation tools, it is possible to prevent the vehicle body of the work vehicle from being inclined to the either side of right and left from the moving straight state due to rotation under the influence between the right and left running wheels, and thereby prevent a hunting state from occurring by repeatedly correcting the balance by a driver with the change speed operation tools.

Consequently, the present invention can provide a work vehicle to improve the running stability while independently running and driving right and left running wheels by a pair of electric motors, and performing a change speed operation to the right and left running wheels independently.

According to a second aspect of the present invention, in addition to the first aspect of the present invention, the controller obtains operation position corresponding speeds that corresponds to the operation positions detected by the change speed operation position detectors based on the operation positions detected by the change speed operation position detectors, and variation characteristics between operation positions and operation position corresponding speeds determined in advance in a state where the operation position corresponding speed becomes greater as the operation position is operated on the speed-increasing side. When the operation position corresponding speeds are different between right and left, in order to reduce the speed difference, the controller sets a value obtained by decreasing the operation position corresponding speed on the high-speed side by a set amount as the target speed, and sets a value obtained by increasing the operation position corresponding speed on the low-speed side by a set amount as the target speed.

According to the second aspect of the present invention, the controller obtains right and left operation position corresponding speeds that corresponds to the operation positions of the right and left change speed operation tools based on the operation positions detected by the change speed operation position detectors, and variation characteristics between operation positions and operation position corresponding speeds determined in advance. When the operation positions of the change speed operation tools are different between right and left, and thereby the operation position corresponding speeds are different between right and left, in order to reduce the speed difference, the controller sets a value obtained by decreasing the operation position corresponding speed on the high-speed side by a set amount as the target speed, and sets a value obtained by increasing the operation position corresponding speed on the low-speed side by a set amount as the target speed.

Specifically, the target speeds with regard to the right and left electric motors for running are set to get closer to each other by a set amount. Consequently, in a case of running straight, for example, it is possible to make the speeds of the right and left electric motors closer to the same speed without significantly increasing the difference between the target speeds and the speeds corresponding to the operation positions of the right and left change speed operation tools, and thereby improve the running stability while preventing a driver from feeling operational discomfort as much as possible.

According to a third aspect of the present invention, in addition to the second aspect of the present invention, the controller sets an added value as the target speed with respect to the operation position corresponding speed on the high-speed side, the added value being obtained by adding a value in which the operation position corresponding speed on the high-speed side is multiplied by a first set ratio and a value in which the operation position corresponding speed on the low-speed side is multiplied by a second set ratio that is smaller than the first set ratio. Furthermore, the controller sets another added value as the target speed with respect to the operation position corresponding speed on the low-speed side, the other added value being obtained by adding a value in which the operation position corresponding speed on the low-speed side is multiplied by the first set ratio and a value in which the operation position corresponding speed on the high-speed side is multiplied by the second set ratio.

According to the third aspect of the present invention, by adding a value in which the operation position corresponding speed on the high-speed side is multiplied by a first set ratio and a value in which the operation position corresponding speed on the low-speed side is multiplied by a second set ratio that is smaller than the first set ratio, it is possible to set a value in which the speed is decreased by a set amount with respect to the operation position corresponding speed on the high-speed side as the target speed.

By adding another value in which the operation position corresponding speed on the low-speed side is multiplied by the first set ratio and a value in which the operation position corresponding speed on the high-speed side is multiplied by the second set ratio, it is possible to set a value in which the speed is increased by a set amount with respect to the operation position corresponding speed on the low-speed side as the target speed.

With this, by reflecting the second set ratio amount of the output of the operation position corresponding speed of one of the change speed operation tools on the operation position corresponding speed of the other of the change speed operation tools, the target speed can be changed while preventing operational discomfort.

According to a fourth aspect of the present invention, in addition to the third aspect of the present invention, the work vehicle includes a set ratio setter to change and set the first set ratio and the second set ratio artificially.

With the fourth aspect of the present invention, it is possible to artificially change the speed-decreasing amount to the operation position corresponding speed on the high-speed side and the speed-increasing amount to the operation position corresponding speed on the low-speed side. It is thus possible to set an appropriate operation state in accordance with the work performance and thereby improve the usability.

According to a fifth aspect of the present invention, in addition to the third aspect of the present invention, the controller changes and sets the first set ratio and the second set ratio in accordance with change in the running speed so as to decrease the first set ratio and increase the second set ratio as the running speed increases.

With the fifth aspect of the present invention, as the running speed increases, the reflected ratio of the output of the operation position corresponding speed of one of the change speed operation tools is increased. Consequently, it is possible to reduce operational discomfort by adjusting the running state in accordance with the actual operation state of the change speed operation tools in a low-speed running state, and improve the running stability in a high-speed running state.

According to a sixth aspect of the present invention, in addition to the second aspect of the present invention, when one of the pair of right and left change speed operation tools is operated in an operation position to command stop and the other of the pair of right and left change speed operation tool is operated in an operation position to command a predetermined operation position corresponding speed, the controller drives the electric motor corresponding to the one of the pair of right and left change speed operation tool at a lower speed than the operation position corresponding speed commanded by the other of the pair of right and left change speed operation tool.

With the sixth aspect of the present invention, when one of the pair of right and left change speed operation tools is operated in an operation position to command stop and the other of the pair of right and left change speed operation tool is operated in an operation position to command a predetermined operation position corresponding speed, the electric motor corresponding to the one of the pair of right and left change speed operation tool is driven at a lower speed than the operation position corresponding speed commanded by the other of the pair of right and left change speed operation tool in spite of commanding stop.

As a result, when a driver tries to run in a state of stopping one of the running wheels, and driving and turning the other of the running wheels, the stopped running wheel runs at a low speed. Consequently, there is an advantage that it is possible to prevent the running wheel from being worn due to friction with the ground by sliding and turning the stopped running wheel. In particular, by applying a mower as the work vehicle, it is possible to reduce a likelihood that lawn will be damaged due to friction with the ground by the running wheel.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 12A and 12B are plan views illustrating a detection state in trace running.

DETAILED DESCRIPTION OF PREFERRED EMBODIMENTS

Figure 1:
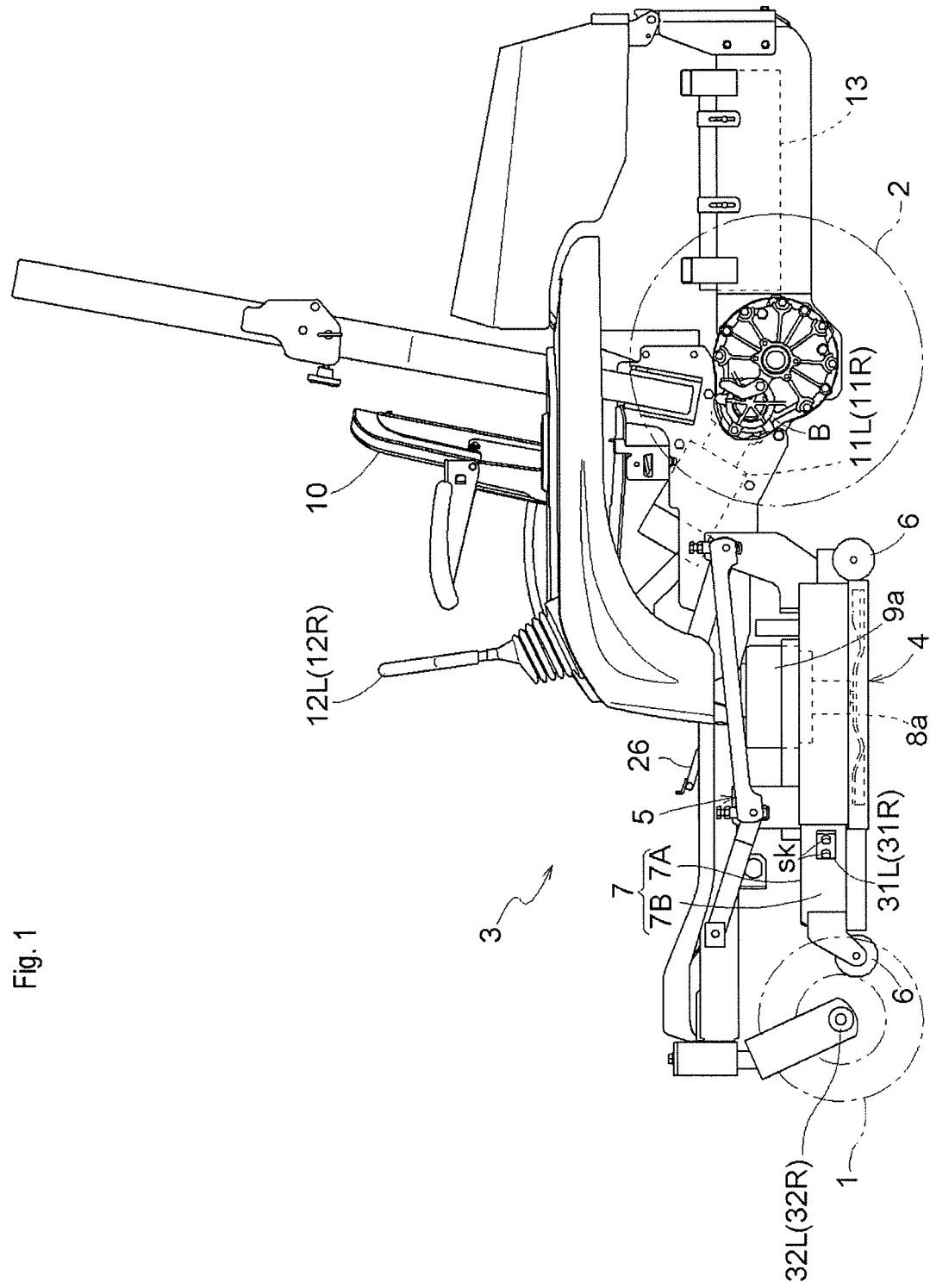
FIG. 1 is an overall side view of a mower.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

A mower is explained below as an example of a work vehicle according to the present invention with reference to the drawings. As shown FIGS. 1 and 2, the mower has a running machine body 3 provided with a pair of right and left front wheels 1 configured as caster wheels and a pair of right and left rear wheels 2 configured as running wheels to be rotated and driven; and a mower 4 that mows the lawn by running the running machine body 3. The mower 4 is suspended and supported by a link mechanism 5 having a quadruple link structure in a lower portion of the running machine body 3 between the front and rear wheels, and elevated and lowered while keeping the horizontal position by grounding with grounded wheels 6.

The mower 4 has a downward-opened cutting edge housing 7 provided with an upper surface 7A and a vertical wall 7B formed in a state of extending downward from the circumferential portion of the upper surface 7A. Three rotation cutting edges 8a, 8b, and 8c, which are rotated and driven around a vertical shaft center, are pivotally supported inside the cutting edge housing 7 to form a triangle in a plan view such that the center is displaced slightly forward. Electric motors for a cutting edge 9a, 9b, and 9c are provided on the upper side of the rotation cutting edges 8a, 8b, and 8c respectively to rotate and drive the rotation cutting edges 8a, 8b, and 8c respectively. The rotation cutting edges 8a, 8b, and 8c are rotated and driven by the electric motors for a cutting edge 9a, 9b, and 9c respectively and independently.

Figure 2:
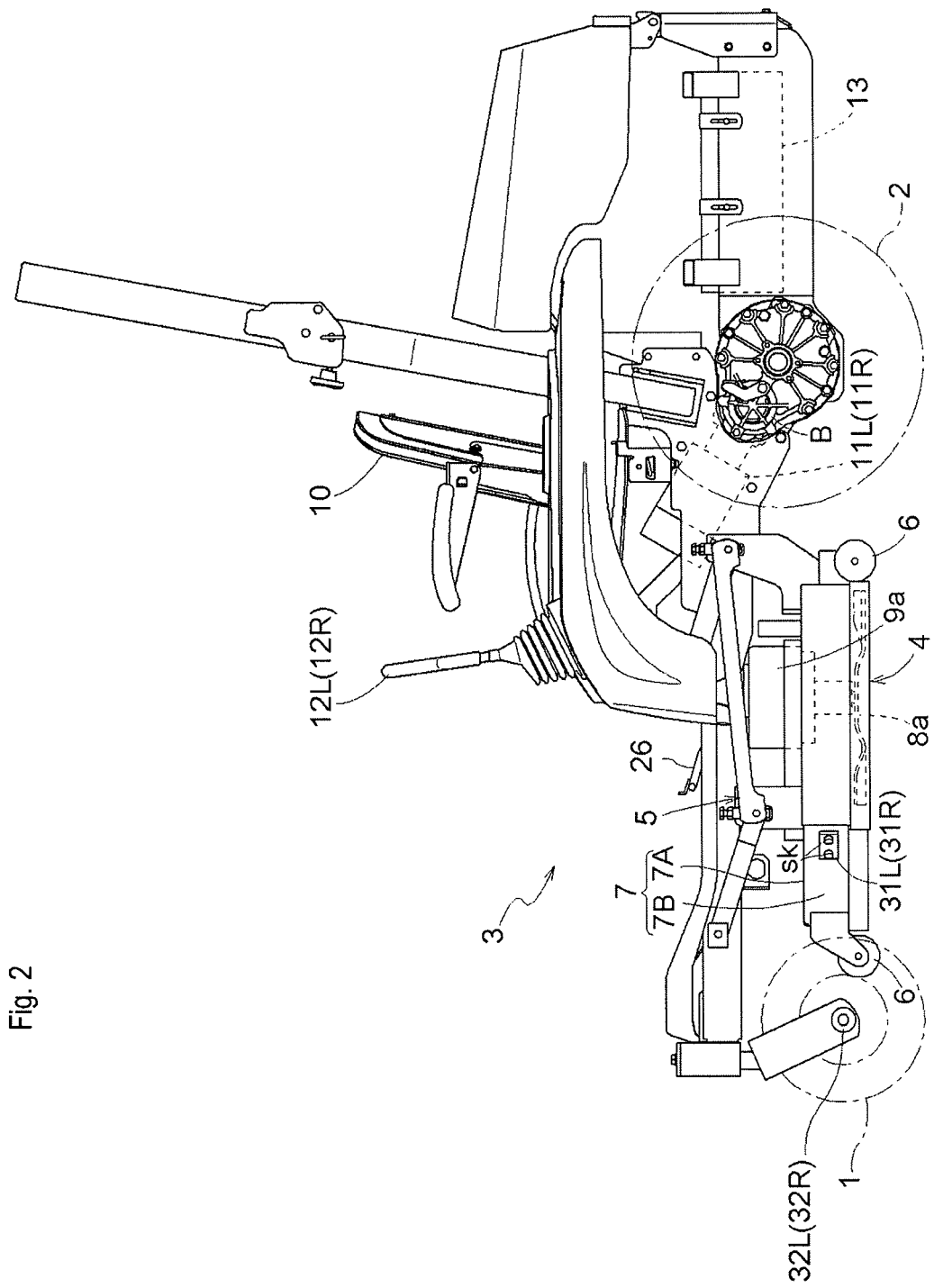
FIG. 2 is an overall plan view of the mower.

As shown FIGS. 1 and 2, a driver seat 10 is provided in the anteroposterior center portion of the running machine body 3. A pair of right and left electric motors for running 11R and 11L are provided to be lined up right and left, and drive the pair of right and left rear wheels 2 respectively and independently. Running change speed levers 12R and 12L are anteroposteriorly swingably provided on the right and left sides of the driver seat 10 as a pair of right and left change speed operation tools independently manually operated and performing a change speed operation on the right and left rear wheels 2. The speeds of the right and left rear wheels 2 are changed independently for both moving forward and backward by performing a change speed operation separately on the pair of right and left electric motors for running 11R and 11L with the pair of right and left running change speed levers 12R and 12L. Specifically, the pair of right and left electric motors for running 11R and 11L correspond to running driving devices that run and drive the running machine body 3 straight and in a manner of being able to freely make a turn.

In the vicinity of the right and left rear wheels 2 driven by the pair of right and left electric motors for running 11R and 11L, a brake B is installed to respectively control movements of the right and left rear wheels 2. The brake B is mechanically cooperated and linked with a brake operation tool 26 provided in a drive section step, so that the brake B controls movements of the right and left rear wheels by operating the brake operation tool 26.

It is possible to move straight and forward by driving the right and left rear wheels 2 in a forward direction at an identical or substantially identical speed. It is possible to move straight and backward by driving the right and left rear wheels 2 in a backward direction at an identical or substantially identical speed.

Also, by differentiating the speeds of the right and left rear wheels 2, the running machine body 3 can be turned in any direction. For example, a small turn becomes possible by reducing the speed of one of the right and left rear wheels 2 to be a low speed close to zero and operating the other of the rear wheels 2 on the forward side or the backward side at a high speed. Further, a spin turn of the running machine body 3 around a substantially central portion between the right and left rear wheels 2 becomes possible by driving the right and left rear wheels 2 in an opposite direction to each other.

Since the pair of right and left front wheels 1 are configured as caster wheels and the direction thereof can be changed freely around the vertical shaft center, the direction can be corrected in accordance with the running direction by driving the pair of right and left rear wheels 2.

Figure 3:
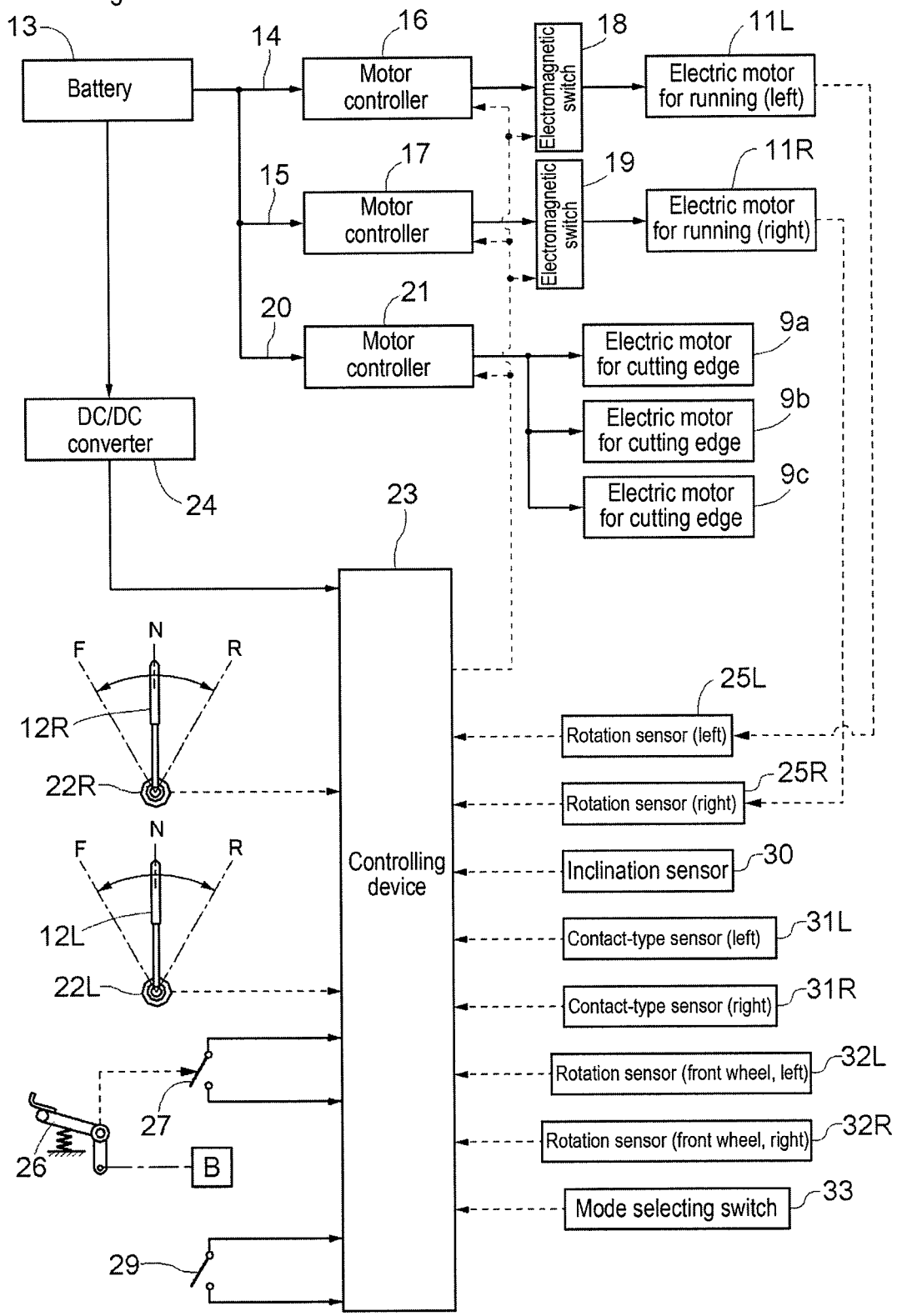
FIG. 3 is a block diagram illustrating control.

As shown in FIG. 1, a battery 13 is provided in the rear portion of the running machine body 3 to supply driving electric power to the respective electric motors for a cutting edge 9a, 9b, and 9c and the electric motors for running 11R and 11L. As shown in FIG. 3, motor controllers 16 and 17 are provided in power supplying passages 14 and 15 supplying power from the battery 13 to the respective right and left electric motors for running 11R and 11L, so as to control the driving state of the electric motors for running 11R and 11L by changing and adjusting voltage, current, or frequency. Electro magnetic switches 18 and 19 are provided between the respective electric motors for running 11R and 11L and the corresponding motor controllers 16 and 17 to block the power supplying passages 14 and 15.

Incidentally, various kinds of motors such as a three-phase alternate current induction motor or a brushless DC motor can be used as the right and left electric motors for running 11R and 11L. The motor controllers 16 and 17 are provided with an inverter device and the like, which is not shown in the drawings.

In a power supplying passage 20 supplying power from the battery 13 to the respective electric motors for a cutting edge 9a, 9b, and 9c, a motor controller 21 is provided to control the driving state of the respective electric motors for a cutting edge 9a, 9b, and 9c.

As shown in FIG. 3, a controlling device 23 is provided as a controller that controls the operation of the respective electric motors for running 11R and 11L by setting target speeds for the respective electric motors for running 11R and 11L and commanding a control signal to the respective motor controllers 16 and 17. Electric power is supplied to the controlling device 23 by converting the voltage of the battery 13 (approximately 48V) into low voltage (approximately 12V) with a DC/DC convertor 24.

A brake switch 27 is provided in the vicinity of the brake operation tool 26, the brake switch 27 being turned ON when a pressing operation is performed on the brake operation tool 26 to which biasing force for return is applied and being turned OFF when a pressing operation is not performed. A mower switch 28 is provided in a state of being located on a side of the driver seat 10, the mower switch 28 being turned ON when start of driving the mower 4 is commanded and being turned OFF when stop is commanded. Detection information of these is input to the controlling device 23.

When the brake switch 27 is turned ON, the controlling device 23 stops driving the electric motors for running 11R and 11L by switching the right and left electro magnetic switches 18 and 19 into a blocked state. When the brake switch 27 is turned OFF, the controlling device 23 restarts driving the electric motors for running 11R and 11L by switching the right and left electro magnetic switches 18 and 19 into a conducted state. Also, when the mower switch 28 is turned ON, the mower 4 performs mowing work by rotating the rotation cutting edges 8a, 8b, and 8c. When the mower switch 28 is turned OFF, the electric motors for a cutting edge 9a, 9b, and 9c are controlled so as to stop the mowing work with the mower 4 by stopping the rotation of the rotation cutting edges 8a, 8b, and 8c.

The controlling device 23 is configured to be switchable between a manual mode and an automatic mode. In the manual mode, the operation of the electric motors for running 11R and 11L is controlled based on the operation of the running change speed levers 12R and 12L. In the automatic mode, the operation of the electric motors for running 11R and 11L is controlled so as to cause the running machine body 3 to autonomously run along a running route set in advance. Also, as shown in FIG. 2, a mode selecting switch 33 is provided on a side of the driver seat 10 to switch the control mode of the controlling device 23 into the manual mode or the automatic mode. The mode selecting switch 33 is provided with an interior lamp, which is not shown in the drawings, lighted when the control mode is switched into the automatic mode.

As shown in FIG. 3, operation position detectors 22R and 22L, and rotation sensors 25R and 25L are provided. The operation position detectors 22R and 22L are configured by potentiometers as a pair of change speed operation position detectors that detect the operation positions of the respective running change speed levers 12R and 12L. The rotation sensors 25R and 25L are configured by a pair of rotary encoders that detect the rotation speeds of the right and left rear wheels 2 driven by the respective right and left electric motors for running 11R and 11L. Detection information of the operation position detectors 22R and 22L and the rotation sensors 25R and 25L is also input to the controlling device 23.

As for the right and left front wheels 1, rotation sensors 32R and 32L are provided to detect the rotation speeds of the right and left front wheels 1. The rotation sensors for front wheels 32R and 32L are used to detect the running state of the running machine body 3 in the automatic mode as described below.

The controlling device 23 sets target speeds with regard to the respective right and left electric motors for running 11R and 11L based on the operation of the running change speed levers 12R and 12L in a case of setting the manual mode by the mode selecting switch 33, and controls the operation of the respective right and left electric motors for running 11R and 11L by commanding a control signal to the respective motor controllers 16 and 17 so as to adjust the speeds of the right and left rear wheels 2 to be the target speeds.

Specifically, in the manual mode, when both of the right and left running change speed levers 12R and 12L are operated by swinging forward by the same amount, both of the right and left rear wheels 2 are driven at the same or substantially the same speed in a forward direction so as to perform straight forward running. When both of the right and left running change speed levers 12R and 12L are operated by swinging backward by the same amount, both of the right and left rear wheels 2 are driven at the same or substantially the same speed in a backward direction so as to perform straight backward running.

When the speeds of the right and left wheels 2 are differentiated by differentiating the operation positions of the right and left running change speed levers 12R and 12L, the running machine body 3 can be moved by turning in any direction. When one of the speeds of the right and left wheels 2 is reduced to be a low speed close to zero and the other of the rear wheels 2 is operated on the forward side or the backward side at a high speed, a small turn can be performed.

When the right and left rear wheels 2 are driven in an opposite direction to each other by operating the right and left running change speed levers 12R and 12L, a spin turn of the running machine body 3 can be performed around a substantially central portion between the right and left rear wheels 2. Since the pair of right and left front wheels 1 are configured as caster wheels and the direction thereof can be changed freely around the vertical shaft center, the direction will be changed corresponding to change in the running direction by driving the pair of right and left rear wheels 2.

As shown in FIGS. 2 and 3, contact-type presence and absence sensors 31R and 31L are provided on both right and left side ends of a front vertical wall 7B1 in the cutting edge housing 7 of the mower 4 as boundary detectors to detect the boundary between an area where mowing is not performed and an area where mowing is already performed. Detection information of these is input to the controlling device 23. The controlling device 23 can detect a position difference from an appropriate running position based on detection information of the contact-type presence and absence sensors 31R and 31L.

In a case where there is inclination in the right and left direction on the ground, the direction will be changed into a different direction due to the inclination state in spite of controlling to run straight. The controlling device 23 therefore corrects the position difference based on the right and left inclination angle from the horizontal position of the running machine body 3. Specifically, as shown in FIG. 3, the running machine body 3 is provided with an inclination sensor 30 that detects the right and left inclination angle from the horizontal position, and detection information of the inclination sensor 30 is input to the controlling device 23.

Figure 13:
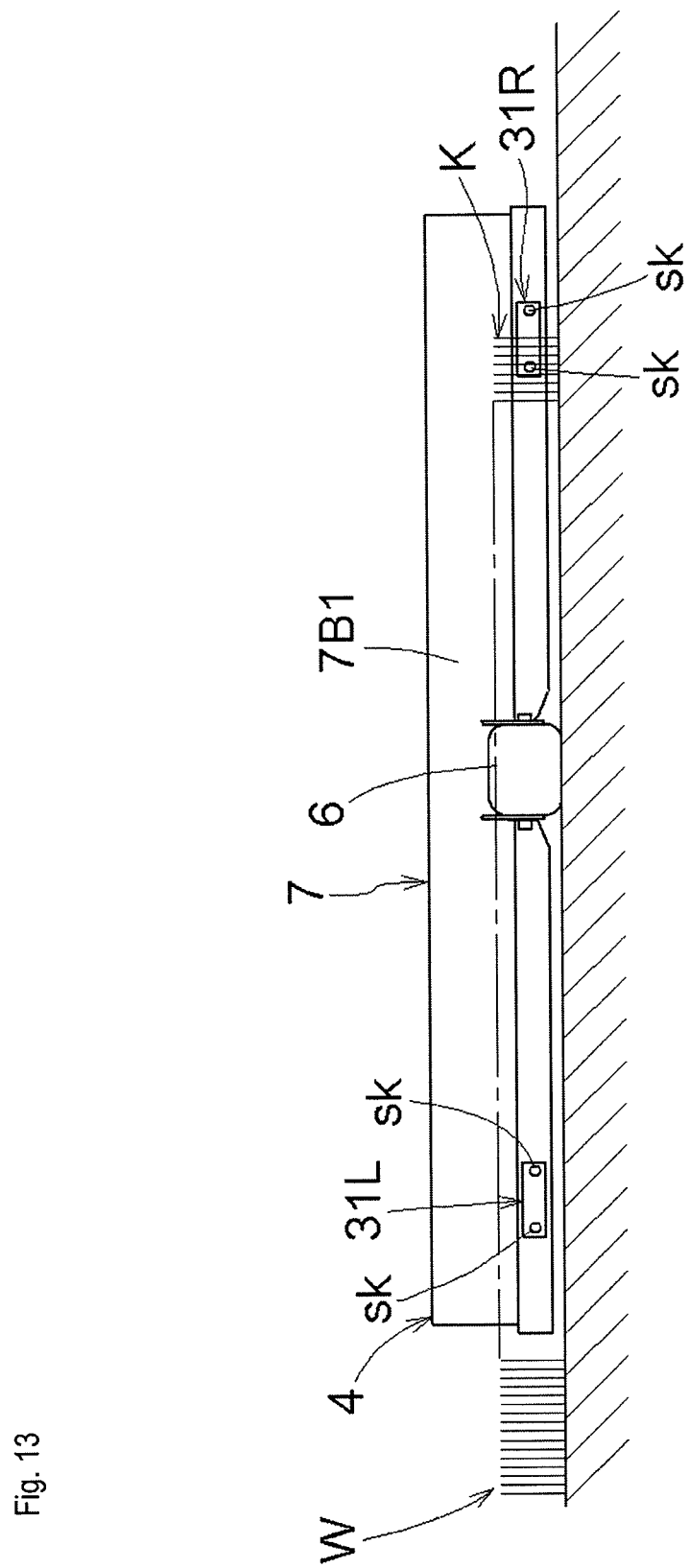
FIG. 13 is a front view illustrating an attachment state of contact-type presence and absence sensors.
Figure 14:
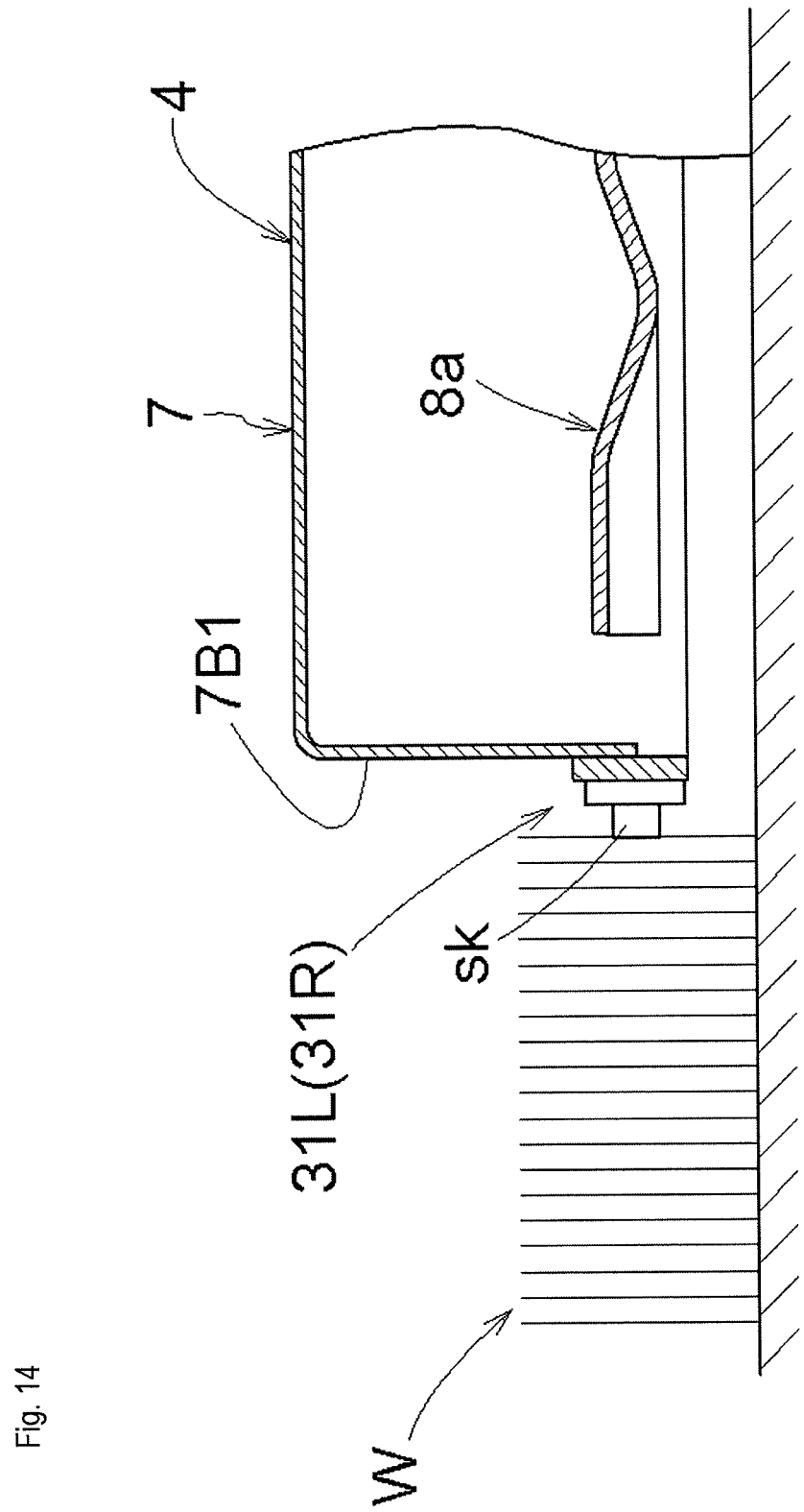
FIG. 14 is a partial side view illustrating the attachment state of the contact-type presence and absence sensors.

As shown in FIGS. 13 and 14, the contact-type presence and absence sensors 31R and 31L are provided on the front surface of the front vertical wall 7B1 in the cutting edge housing 7, so as to detect presence and absence of lawn on the front surface of the front vertical wall 7B1. The respective contact-type presence and absence sensors 31R and 31L are provided with contact sensors sk in a state of being spaced apart from each other right and left at a predetermined distance. The contact sensors sk are turned ON when lawn contacts, and turned OFF when lawn does not contact. Although detailed configuration is not shown in the drawings, each of the contact sensors sk is turned ON when its flexible material is deformed at the time of contacting lawn and an electrode provided inside is caused to abut, and turned OFF when lawn does not contact and the electrode is spaced apart by elastic restoring force.

In a case of setting the automatic mode by the mode selecting switch 33, in order to cause the running machine body 3 to autonomously run along a running route set in advance, the controlling device 23 sets target speeds with regard to the respective right and left electric motors for running 11R and 11L based on information of the running route, and controls the operation of the respective right and left electric motors for running 11R and 11L by commanding a control signal to the respective motor controllers 16 and 17 so as to adjust the speeds of the right and left rear wheels 2 to be the target speeds. The control operation of the controlling device 23 in the automatic mode will be described below.

Control in Manual Mode

The controlling device 23 controls the operation of the respective electric motors for running 11R and 11L by setting target speeds with regard to the respective electric motors for running 11R and 11L such that the speed difference in the target speeds is smaller than the speed difference corresponding to the difference in the operation positions of the respective running change speed levers 12R and 12L by a set amount in a case where the operation positions of the respective running change speed levers 12R and 12L are different between right and left.

Specifically, the controlling device 23 obtains operation position corresponding speeds that corresponds to the operation positions detected by the operation position detectors 22R and 22L based on the operation positions of the running change speed levers 12R and 12L detected by the operation position detectors 22R and 22L, and variation characteristics between operation positions and operation position corresponding speeds determined in advance in a state where the operation position corresponding speed increases as the operation position is operated on the speed-increasing side. When the operation position corresponding speeds are different between right and left, in order to reduce the speed difference, the controlling device 23 sets a value obtained by decreasing the operation position corresponding speed on the high-speed side by a set amount as the target speed, and sets a value obtained by increasing the operation position corresponding speed on the low-speed side by a set amount as the target speed.

More specifically, the controlling device 23 sets an added value as the target speed with respect to the operation position corresponding speed on the high-speed side, the added value being obtained by adding a value in which the operation position corresponding speed on the high-speed side is multiplied by a first set ratio (for example, 80%) and a value in which the operation position corresponding speed on the low-speed side is multiplied by a second set ratio (for example, 20%) that is smaller than the first set ratio. Also, the controlling device 23 sets an added value as the target speed with respect to the operation position corresponding speed on the low-speed side, the added value being obtained by adding a value in which the operation position corresponding speed on the low-speed side is multiplied by the first set ratio (for example, 80%) and a value in which the operation position corresponding speed on the high-speed side is multiplied by the second set ratio (for example, 20%).

Figure 4:
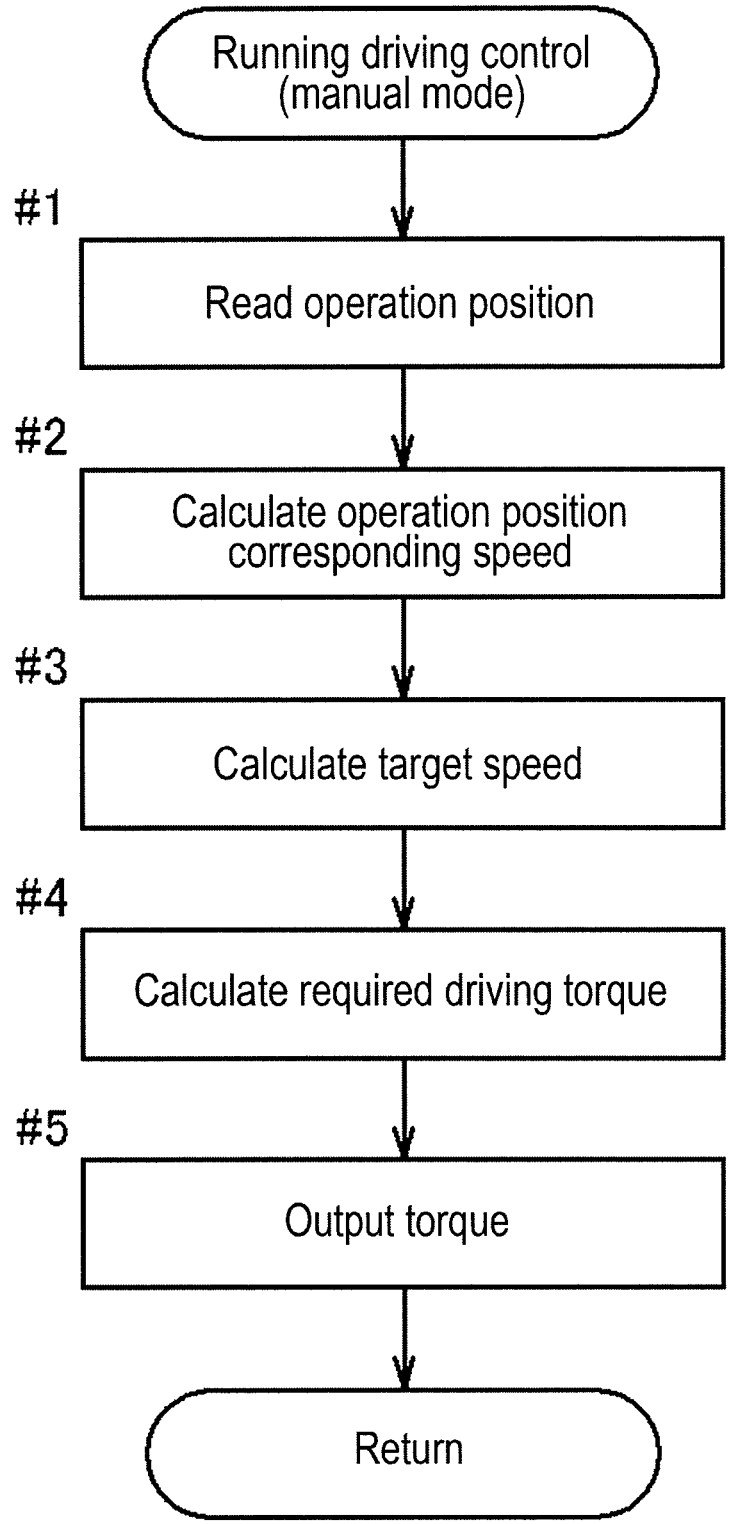
FIG. 4 is a flow chart of running driving control.

Next, an explanation will be made on running driving control by the controlling device 23 in the manual mode with reference to the flow chart shown in FIG. 4. In this running driving control, control operation as shown in FIG. 4 is performed repeatedly per unit time.

The controlling device 23, first, reads the operation positions of the running change speed levers 12R and 12L from detection values of the right and left operation position detectors 22R and 22L, and performs operation position corresponding speed calculation processing to obtain operation position corresponding speeds that corresponds to the operation positions based on the detection values of the respective operation position detectors 22R and 22L (steps 1 and 2).

The controlling device 23 obtains operation position corresponding speeds that corresponds to the operation positions detected by the respective operation position detectors 22R and 22L based on the operation positions detected by the operation position detectors 22R and 22L, and variation characteristics between operation positions and operation position corresponding speeds determined in advance in a state where the operation position corresponding speed increases as the operation position is operated on the speed-increasing side.

Figure 5:
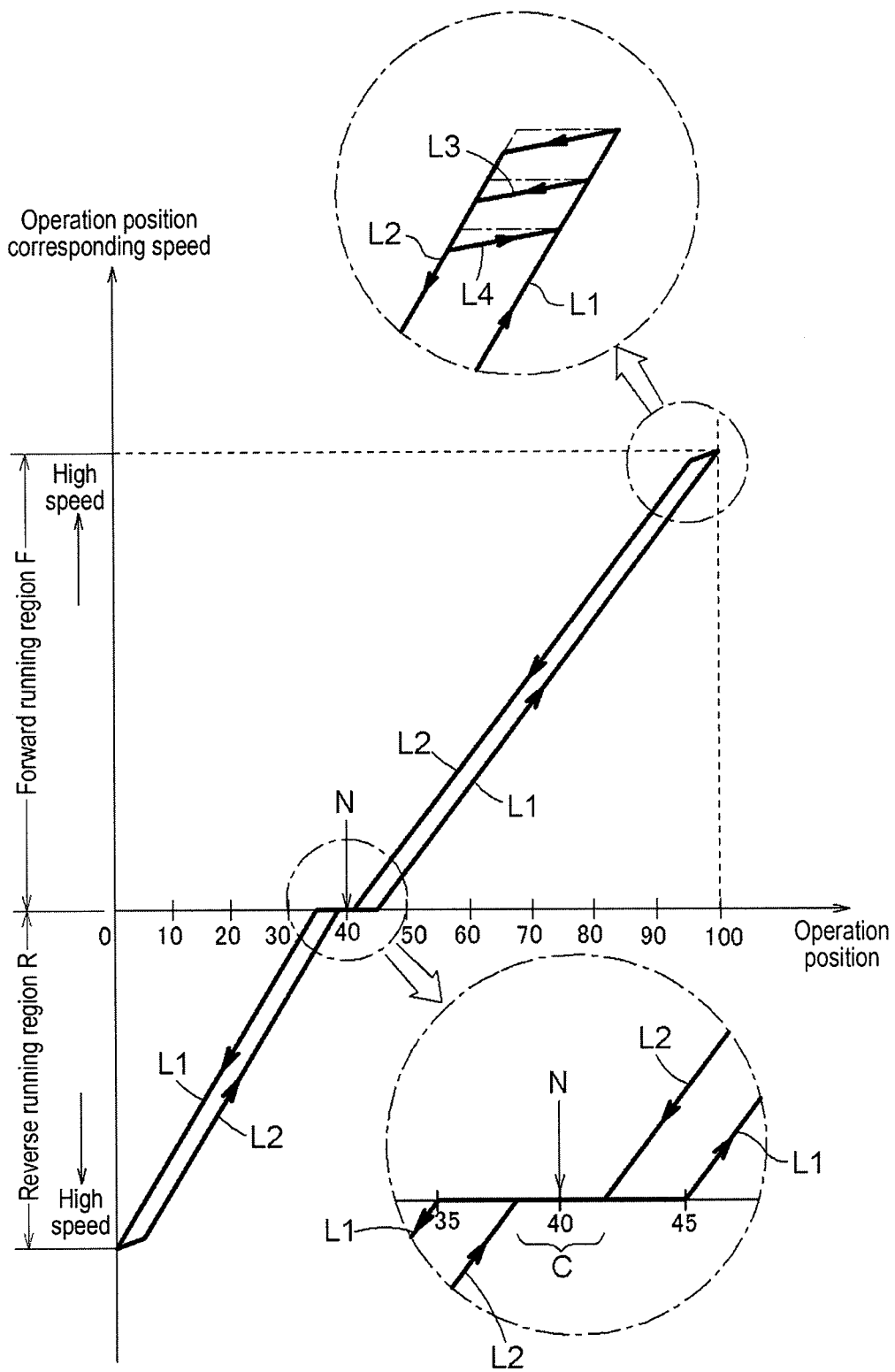
FIG. 5 is a graph showing variation characteristics of operation positions and operation position corresponding speeds.

The variation characteristics between operation positions and operation position corresponding speeds are variation characteristics as shown in FIG. 5, for example. An explanation will be made on these variation characteristics. The horizontal axis of FIG. 5 shows operation positions detected by the operation position detectors 22R and 22L, and the vertical axis shows operation position corresponding speeds. The operation position varies from a minimum position (0) to a maximum position (100). The operation position corresponding speed is divided into a normal rotation direction region (forward running region F) and a reverse rotation direction region (reverse running region R). Between a minimum position (0) and a maximum position (100), a region from a neutral position (40) to the maximum position (100) (for example, region of 60% of the entire operation range) is set as the normal rotation direction region (forward running region F). A region from the minimum position (0) to the neutral position (40) (for example, region of 40% of the entire operation range) is set as the reverse rotation direction region (reverse running region R).

A dead zone region C (for example, approximately 5% of the entire operation range) is set in the vicinity of the neutral position N, in which the operation position corresponding speed keeps a zero speed even when the operation positions of the running change speed levers 12R and 12L slightly change. Also, in each of the normal rotation direction region (forward running region F) and the reverse rotation direction region (reverse running region R), a first variation characteristic L1 and a second variation characteristic L2 are set respectively. The first variation characteristic L1 is applied when the operation positions of the running change speed levers 12R and 12L change on the speed-increasing side, and the second variation characteristic L2 is applied when the operation positions of the running change speed levers 12R and 12L change on the speed-decreasing side.

As shown in FIG. 5, the first variation characteristic L1 changes linearly in each of the normal rotation direction region (forward running region F) and the reverse rotation direction region (reverse running region R). In other words, the first variation characteristic L1 is a variation characteristic in which the variation ratio of the operation position corresponding speeds with respect to variation of the operation positions of the running change speed levers 12R and 12L is uniform. The second variation characteristic L2 changes linearly similar to the first variation characteristic L1.

When the running change speed levers 12R and 12L are operated from the neutral position N to the speed-increasing side, the operation position corresponding speeds that corresponds to the operation positions are obtained based on the operation positions obtained from the detection values of the operation position detectors 22R and 22L and the first variation characteristic L1 of FIG. 5. On the other hand, when the running change speed levers 12R and 12L are operated from the speed-increasing side toward the neutral position N to the speed-decreasing side, the operation position corresponding speeds are obtained based on the operation positions obtained from the detection values of the operation position detectors 22R and 22L and the second variation characteristic L2 of FIG. 5.

When the running change speed levers 12R and 12L are switched from a state of being operated on the speed-increasing side into a state of being operated on the speed-decreasing side, variation occurs along a third variation characteristic for switching L3, as shown in the partially enlarged view of FIG. 5, rather than the first variation characteristic L1 or the second variation characteristic L2. The third variation characteristic for switching L3 is set such that the variation amount of the output value of the operation position corresponding speed with respect to the variation in the unit amount of the operation position is smaller (for example, approximately ⅕) in the third variation characteristic for switching L3 than in the first variation characteristic L1 or the second variation characteristic L2.

When the running change speed levers 12R and 12L are switched from a state of being operated on the speed-decreasing side into a state of being operated on the speed-increasing side, variation occurs along a fourth variation characteristic for switching L4 which is set such that the variation amount of the operation position corresponding speed with respect to the variation in the unit amount of the operation position is smaller (for example, approximately ⅕) in the fourth variation characteristic for switching L4 than in the first variation characteristic L1 or the second variation characteristic L2.

Incidentally, the partially enlarged view of FIG. 5 shows an example in which the first variation characteristic L1 and the second variation characteristic L2 are in a region where the operation position is close to the maximum position (100). The third variation characteristic for switching L3 and the fourth variation characteristic for switching L4 are applied to the entire operation range where the operation position varies from the minimum position (0) to the maximum position (100).

With this configuration, even when the running change speed levers 12R and 12L swing back and forth against the driver's will due to shaking of the vehicle body during work running, it is easier to secure the running stability by controlling an unnecessary change speed operation in which the target speed changes in accordance with the swing operation.

Next, the controlling device 23 calculates the target speeds for the respective electric motors for running 11R and 11L (step 3). For calculating the target speeds, the controlling device 23 sets a value obtained by decreasing the operation position corresponding speed on the high-speed side by a set amount as the target speed, and sets a value obtained by increasing the operation position corresponding speed on the low-speed side by a set amount as the target speed, so as to reduce the speed difference between right and left.

In more detail, the target speed of either one of the right and left electric motors for running (11R or 11L) is not set only by the operation position corresponding speed that corresponds to the operation position of the corresponding running change speed lever (12R or 12L). A predetermined ratio of the output of the operation position corresponding speed of the opposite running change speed lever (12R or 12L) is reflected.

The operation position corresponding speed of the left running change speed lever 12L is changed to be a value which corresponds to a predetermined ratio of the operation position corresponding speed obtained by step 2 (for example, 80%) (which corresponds to the first set ratio). Also, the speed which corresponds to a predetermined ratio of the operation position corresponding speed obtained by step 2 (for example, 20%) (which corresponds to the second set ratio) is added to the operation position corresponding speed of the right running change speed lever 12R.

Similarly, the operation position corresponding speed of the right running change speed lever 12R is changed to be a value which corresponds to 80% of the operation position corresponding speed obtained by step 2. Also, the speed which corresponds to 20% of the operation position corresponding speed obtained by step 2 is added to the operation position corresponding speed of the left running change speed lever 12L.

Accordingly, the target speed for the left electric motors for running 11L becomes a value obtained by adding the speed which corresponds to 80% of the operation position corresponding speed obtained by step 2 and the speed which corresponds to 20% of the operation position corresponding speed of the right running change speed lever 12R. Also, the target speed for the right electric motors for running 11R becomes a value obtained by adding the speed which corresponds to 80% of the operation position corresponding speed obtained by step 2 and the speed which corresponds to 20% of the operation position corresponding speed of the left running change speed lever 12L.

Figure 7:
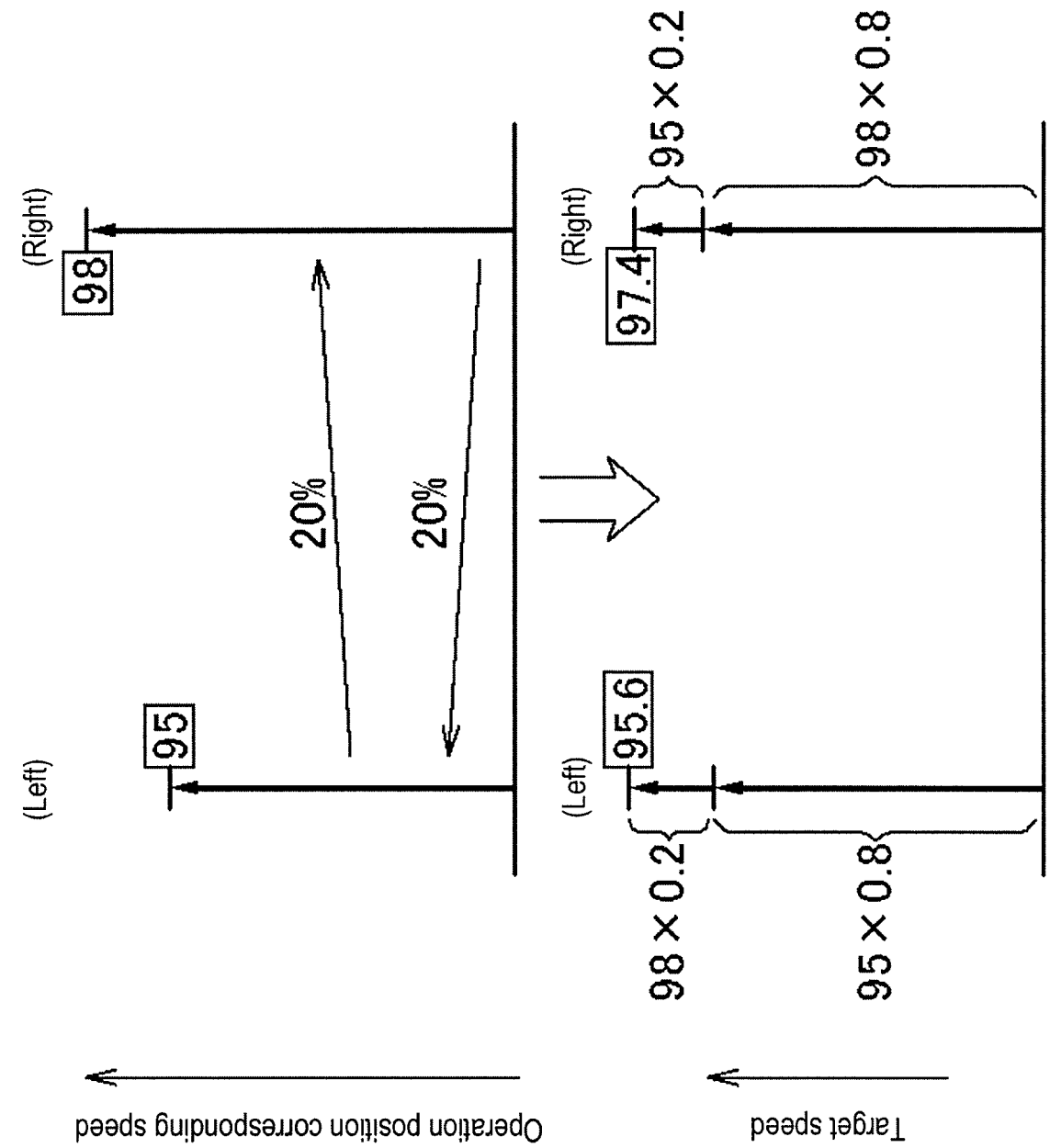
FIG. 7 is a graph showing a calculation state of a target speed.

Examples of specific numerical values are as follows: as shown in FIG. 7, in a case where straight running is commanded, the right running change speed lever 12R commands a speed which corresponds to "98%", and the left running change speed lever 12L commands a speed which corresponds to "95%", when the above-described adding processing is performed, the target speed for the right electric motors for running 11R becomes a speed which corresponds to "97.4%", and the target speed for the left electric motors for running 11L becomes a speed which corresponds to "95.6%". In other words, a value whose speed is decreased by 0.6% as a set amount with respect to the operation position corresponding speed on the high-speed side is set as the target speed, and a value whose speed is increased by 0.6% as a set amount with respect to the operation position corresponding speed on the low-speed side is set as the target speed.

Figure 8:
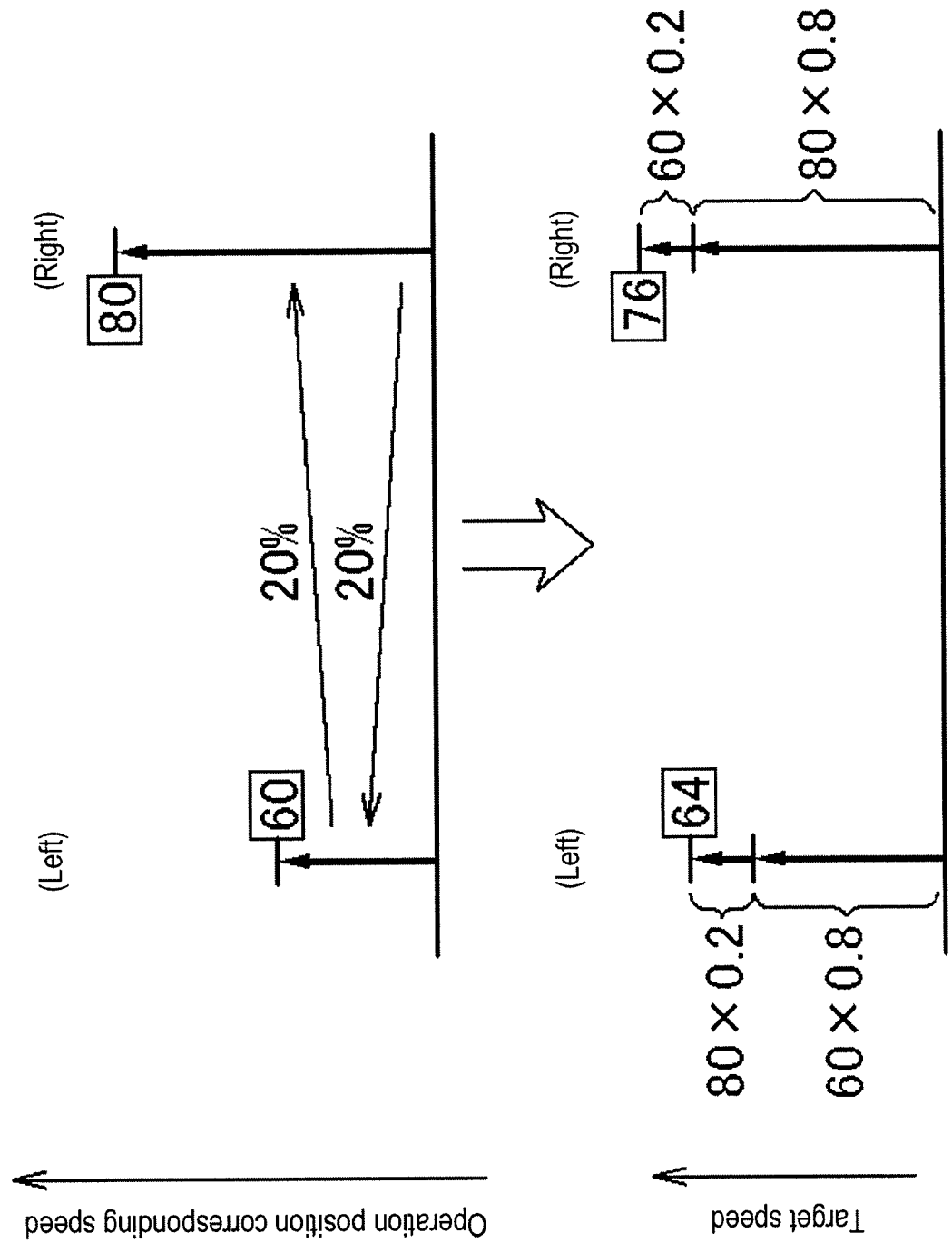
FIG. 8 is a graph showing a calculation state of a target speed.

As shown in FIG. 8, in a case where the right running change speed lever 12R commands a speed which corresponds to "80%" and the left running change speed lever 12L commands a speed which corresponds to "60%", the target speed for the right electric motors for running 11R becomes a speed which corresponds to "76%", and the target speed for the left electric motors for running 11L becomes a speed which corresponds to "64%". In this example, a value whose speed is decreased by 4% as a set amount with respect to the operation position corresponding speed on the high-speed side is set as the target speed, and a value whose speed is increased by 4% as a set amount with respect to the operation position corresponding speed on the low-speed side is set as the target speed.

Next, the controlling device 23 obtains required driving torque to be output from the right and left electric motors for running 11R and 11L based on the above target speeds (step 4). First, in order to obtain the required driving torque, a control command speed for the right and left electric motors for running 11R and 11L is calculated based on the target speeds. Then, the driving torque required for adjusting the speeds of the electric motors for running 11R and 11L to be the control command speed is obtained based on the control command speed, the actual rotation speeds of the electric motors for running 11R and 11L, map data set in advance, and the like.

Although a detailed explanation on computing processing is omitted, a torque upper limit value is determined so as to prevent the driving torque from drastically increasing to be a great value even when the target speeds drastically increase by a drastic change speed operation of the running change speed levers 12R and 12L. Torque actually output from the electric motors for running 11R and 11L is arranged not to exceed this torque upper limit value.

Figure 6:
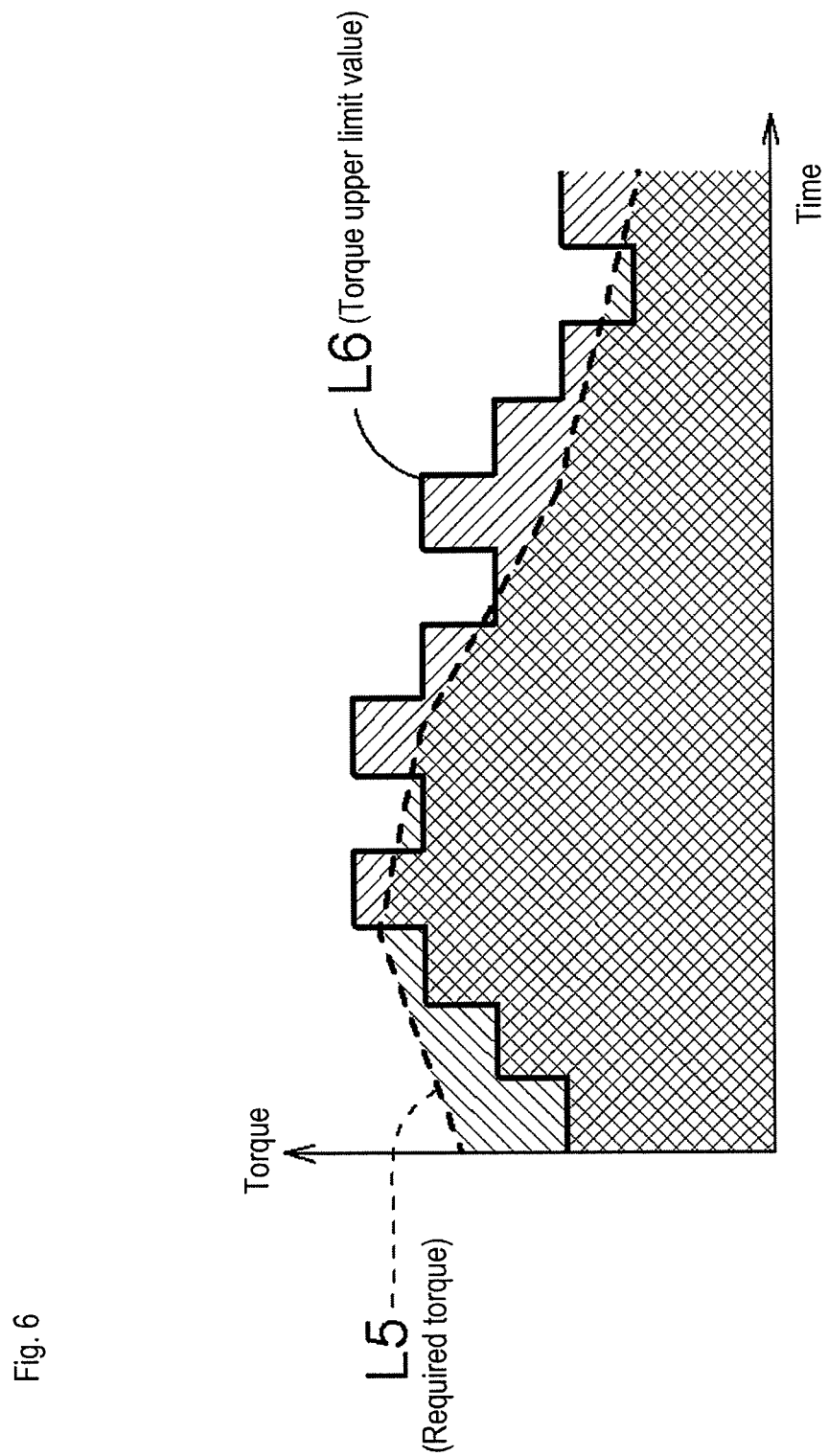
FIG. 6 is a graph showing a variation state of torque.

In more detail, as shown in FIG. 6, for example, the required driving torque obtained from the target speeds increases or decreases corresponding to the operation state of the running change speed levers 12R and 12L at that time (see line L5 of FIG. 6). Regarding the driving torque, it is necessary to obtain a value which corresponds to the operation state of the running change speed levers 12R and 12L as much as possible. However, in a case where the target speeds drastically increase by a drastic change speed operation of the running change speed levers 12R and 12L, obtaining the driving torque just corresponding to this state makes torque variation too great, which results in sudden start, sudden stop, and the like.

The torque upper limit value is thus determined. As shown in line L6 of FIG. 6, for example, the torque upper limit value is set to be increased by a predetermined amount per set time when the target speed increases. In a case where the required driving torque exceeds the torque upper limit value (region where line L6 exceeds line L5 in FIG. 6), the actual output torque is controlled to be the torque upper limit value (L6). Specifically, the actual output torque is shown by the area where diagonal lines overlap in FIG. 6.

FIG. 6 also shows a case where the driving torque (L5), obtained from the target speed, changes in a gradually inclined state. Although the inclination of line L5 becomes steep by drastic change in the speed, the torque upper limit value is increased by a predetermined amount per set time in such a case, which makes it possible to prevent the running from becoming unstable. In a case where the required driving torque is less than the torque upper limit value, the torque upper limit value is decreased by a predetermined amount per set time.

In order to output the driving torque obtained as described above, the controlling device 23 outputs a command signal to the motor controllers 16 and 17 (step 5), and drives and controls the electric motors for running 11R and 11L.

Incidentally, the controlling device 23 is configured to block the electro magnetic switches 18 and 19 when the brake switch 27 detects that a brake operation tool 26 is operated by pressing during performing control in the manual mode. With this configuration, too much force is not applied to the electric motors for running 11R and 11L.

Although a detailed explanation is not made, when an abnormal operation such as an abnormal value of electric current supplied to the electric motors for a cutting edge 9a, 9b, and 9c caused by clogging of lawn in the mower 4, for example, is detected during performing control in the manual mode, the controlling device 23 causes the vehicle body to automatically stop running, or gives an alert by an alarm such as an alarm buzzer, which is not shown in the drawings, so as to encourage a brake operation.

Control in Automatic Mode

Figure 9:
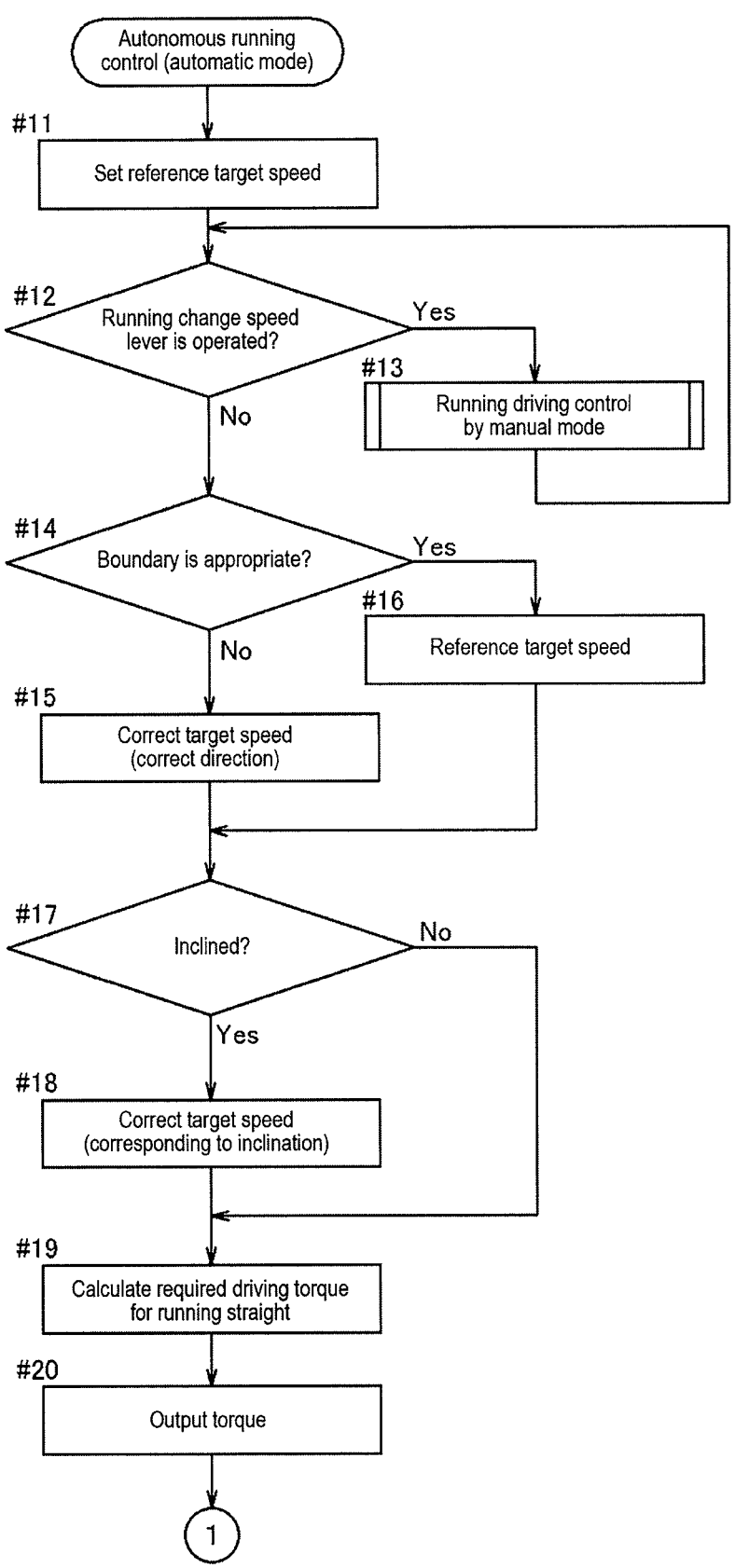
FIG. 9 is a flow chart of autonomous running control.
Figure 10:
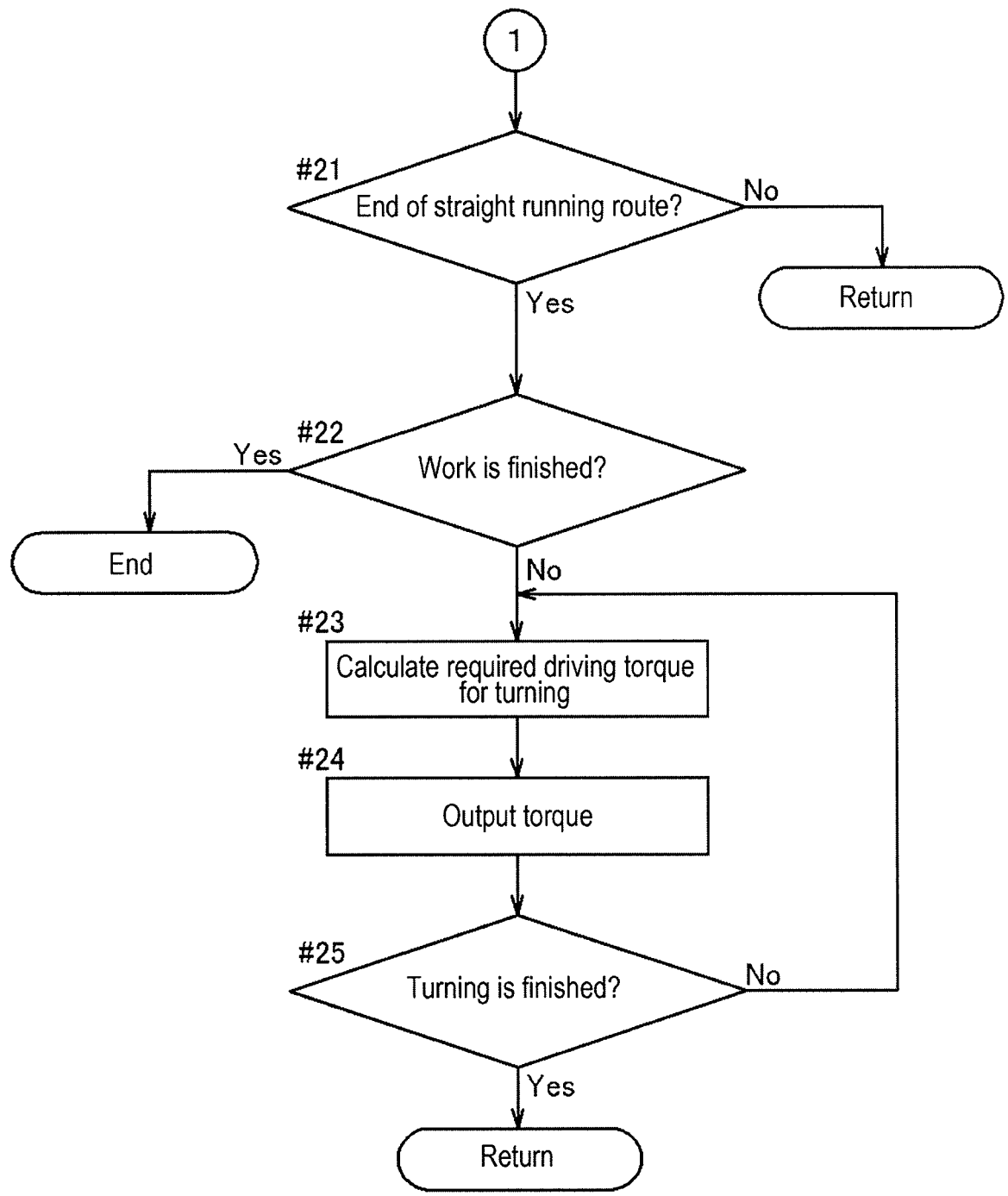
FIG. 10 is a flow chart of autonomous running control.

Next, an explanation will be made on autonomous running control by the controlling device 23 in the automatic mode with reference to the flow chart shown in FIG. 9. The controlling device 23 performs the autonomous running control when the mode selecting switch 33 is switched into the automatic mode.

Figure 11A:
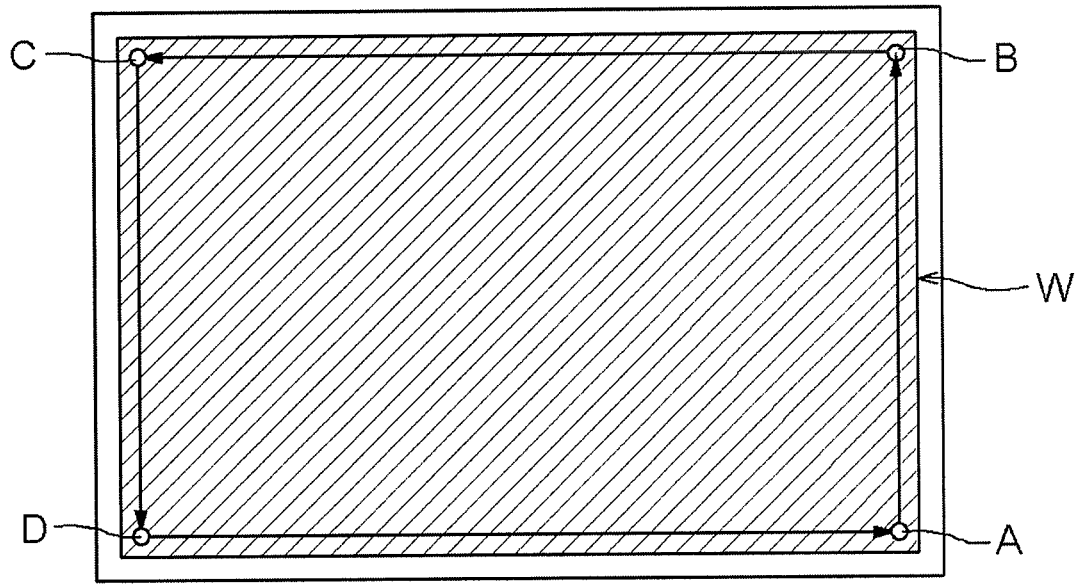
FIGS. 11A and 11B are plan views illustrating work performance along a running route.
Figure 11B:
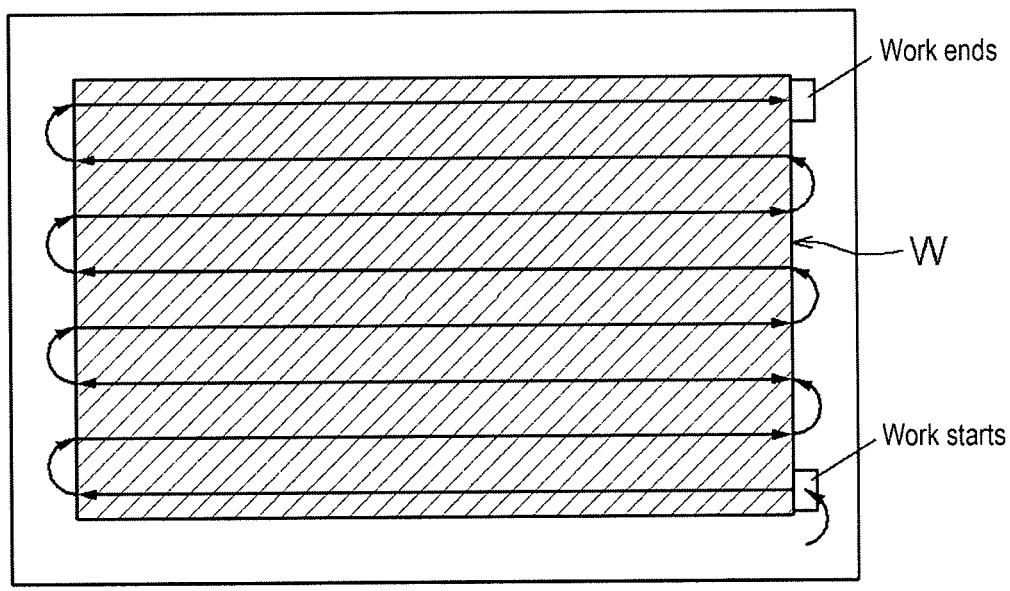

Control by the controlling device 23 in the automatic mode is performed in a case of performing mowing work in a predetermined work object area W. Next, an explanation will be made on mowing work performed in a state of setting the controlling device 23 in the automatic mode in a case where the work object area W for mowing work is set as shown in FIG. 11.

Prior to mowing work by automatic driving, a driver performs mowing by manual driving in a rectangular periphery of the work object area W. In this instance, the driver operates a teaching mode switch 29 provided on a side of the driver seat 10 to set the controlling device 23 in a teaching control mode, and performs mowing work by manual driving in that state. The teaching mode switch 29 causes an interior lamp, which is not shown in the drawings, to be lighted in the teaching control mode. Also, a display device, which is not shown in the drawings, displays a current control state of the controlling device 23, so that a driver can confirm the state.

Although a detailed explanation on control processing is omitted, a distance is measured while manually driving in the peripheral portion of the work object area W, and a running route for automatic running is obtained by computing in the teaching mode.

Simply put, the running distance of the running machine body is measured in the straight running route from a work starting position A to a position B based on the detection information of the respective rotation sensors 25R, 25L, 32R and 32L. Similarly, thereafter, the running distance of the running machine body 3 is measured in the straight running route from the position B to a position C, the straight running route from the position C to a position D, and the straight running route from the position D to the position A, respectively.

In this instance, for detecting the running distance of the running machine body 3, there is a likelihood that detection results will be different from the actual running distance due to idling caused by slipping when the rear wheels 2 are driven by the electric motors for running 11R and 11L. Thus, by using detection results of the rotation sensors 32R and 32L provided in the front wheels 1 which rotate under the influence while being grounded, the running distance can be detected with good accuracy.

Next, the most preferable running route (see FIG. 11(*b*)) for repeatedly performing mowing work along a plurality of straight routes and turning running at a terminal end is obtained by computing based on the above measurement information of the running distance, the correlative relationship between the turning radius of the running machine body 3 and the speed difference, and the like. The obtained running route is stored in the controlling device 23.

In order to perform work in the work object area W, the mower is located at a work starting position (see FIG. 11(*b*)), and switched into the automatic mode. Autonomous running control is thereafter performed.

In the autonomous running control, the controlling device 23 first sets a reference target speed corresponding to both of a straight running route and a turning route based on the data which has been set in advance and stored for performing autonomous running control (step 11).

When the running change speed levers 12R and 12L are operated, running driving control by the operation of the running change speed levers 12R and 12L is performed with priority in spite of the ongoing autonomous running control (steps 12 and 13). For example, in a case of detecting that the operation positions of the running change speed levers 12R and 12L are displaced from the dead zone region C and operated into the normal rotation direction region (forward running region F) during forward running, the mode is switched into the manual mode and running driving control as shown in FIG. 4 is performed. When the operation positions of the running change speed levers 12R and 12L thereafter return to the dead zone region C, autonomous running control is performed again.

When the work running is performed along the straight running route, in order to correct the position difference from the running route, a mown boundary K between a region where mowing is performed and a region where mowing is not performed is detected, and the controlling device 23 controls the operation of the electric motors for running 11R and 11L such that the running machine body 3 performs trace running along the mown boundary K.

Specifically, when it is determined that the running change speed levers 12R and 12L are not being operated and the position of the running machine body 3 is not appropriate to the mown boundary K, the reference target speed is corrected to correct the direction of the running machine body 3 as the target speed for the respective electric motors for running 11R and 11L (steps 14 and 15).

For judging whether or not the position of the running machine body 3 is appropriate to the mown boundary K, when it is detected that both of the contact sensors sk on the right and left sides of one of the contact-type presence and absence sensors 31R and 31L which corresponds to the side of the mown boundary K with respect to the moving direction of the running machine body 3 detect presence of lawn or do not detect presence of lawn, it is judged that the running machine body 3 is displaced from the mown boundary K to the left. When the contact sensor sk located on the side where mowing is not performed of the right and left contact sensors sk detects presence of lawn, and the contact sensor sk located on the opposite side does not detect presence of lawn, it is judged that the position of the running machine body 3 is appropriate to the mown boundary K.

In more detail, when the side where mowing is not performed is located on the left side with respect to the moving direction of the running machine body 3 (see FIG. 12(*a*)), the judgment is performed based on detection information of the right contact-type presence and absence sensor 31R. When the side where mowing is not performed is located on the right side with respect to the moving direction of the running machine body 3 (see FIG. 12(*b*)), the judgment is performed based on detection information of the left contact-type presence and absence sensor 31L.

An explanation will be made on correction of the target speed. For example, when the running machine body 3 is displaced from the mown boundary K to the left, the direction of the running machine body 3 is corrected by increasing the target speed of the left rear wheel 2 by a set amount and decreasing the target speed of the right rear wheel 2 by a set amount. Also, when the running machine body 3 is displaced from the mown boundary K to the right, the direction of the running machine body 3 is corrected by increasing the target speed of the right rear wheel 2 by a set amount and decreasing the target speed of the left rear wheel 2 by a set amount.

When it is judged that the position of the running machine body 3 is appropriate to the mown boundary K, the reference target speed is used as the target speed (step 16). That is, the reference target speed is kept as is, or when the target speed is changed as described below, it is returned to the reference target speed.

When the inclination sensor 30 detects that the right and left inclination angles of the running machine body 3 are inclined from the horizontal position by a set angle or more, the target speeds for the respective electric motors for running 11R and 11L are corrected to control the moving direction of the running machine body 3 from being changed by the inclination (steps 17 and 18).

For example, when the running machine body 3 is inclined downward to the left, the target speed for the left rear wheel 2 is increased by a set amount, and the target speed for the right rear wheel 2 is decreased by a set amount. Also, when the running machine body 3 is inclined downward to the right, the target speed for the right rear wheel 2 is increased by a set amount, and the target speed for the left rear wheel 2 is decreased by a set amount.

Next, a control command speed for both of the right and left electric motors for running 11R and 11L is calculated based on the target speed corrected as described above. Driving torque required for causing the speeds of the electric motors for running 11R and 11L to be the control command speed is obtained based on the control command speed, the actual rotation speeds of the electric motors for running 11R and 11L, and the like (step 19). A command signal is output to the motor controllers 16 and 17 to output the obtained driving torque, and the electric motors for running 11R and 11L are driven and controlled (step 20).

In a case where the running machine body 3 is caused to run along the straight running route, the speed is gradually increased immediately after starting running. Once the speed is increased to a predetermined speed, the speed is kept uniform until running a set distance. When approaching a turning area after running a set distance, the reference target speed is set in a state where the speed is gradually decreased.

When both of the contact sensors sk of the respective contact-type presence and absence sensors 31R and 31L are switched into a state of not detecting presence of lawn and thereby arriving at the end terminal of the straight running route is detected (step 21), in a case where work is not finished in the work object area W, control for turning running is performed to move toward an adjacent straight running route (step 22). That is, driving torque required for turning running is obtained from a target speed for turning running set in advance (step 23). A command signal is output to the motor controllers 16 and 17 to output the obtained driving torque for turning running, and the electric motors for running 11R and 11L are driven and controlled (step 24).

When the turning running is finished (step 25), the above-described processing (steps 11-20) is performed for running along a next straight running route. When this control is performed repeatedly and running in the last straight running route is finished in the work object area W, the control is finished (step 22).

Incidentally, the controlling device 23 is configured to block the electro magnetic switches 18 and 19 when the brake switch 27 detects that the brake operation tool 26 is operated by pressing during control in the automatic mode. Also, when an abnormal operation such as an abnormal value of electric current supplied to the electric motors for a cutting edge 9a, 9b, and 9c caused by clogging of lawn in the mower 4 is detected in the automatic mode, the controlling device 23 causes the vehicle body to automatically stop running. A structure is also possible in which the driving torque for the electric motors for running 11R and 11L is controlled to be zero when the brake operation tool 26 is operated by pressing without providing the electro magnetic switches 18 and 19.

Alternative Embodiments (1) In the above embodiment, the target speed for the left electric motor for running 11L is a value obtained by adding the speed which corresponds to 80% (first set ratio) of the operation position corresponding speed and the speed which corresponds to 20% (second set ratio) of the operation position corresponding speed of the right running change speed lever 12R. The target speed for the right electric motor for running 11R is a value obtained by adding the speed which corresponds to 80% of the operation position corresponding speed and the speed which corresponds to 20% of the operation position corresponding speed of the left running change speed lever 12L. However, the following (1-1)-(1-4) are also possible.

(1-1) For example, the first set ratio may be set arbitrarily to be a relatively large reference value and the second set ratio may be set arbitrarily to be a value smaller than the reference value instead of using the first set ratio and the second set ratio which become 100% by adding.

(1-2) When the running speed is a low speed, a value smaller than a value which corresponds to 20% of the operation position corresponding speed on the opposite side (for example 15%) may be added. When the running speed is a high speed, a value greater than a value which corresponds to 20% of the operation position corresponding speed on the opposite side (for example 30%) may be added.

(1-3) A predetermined amount of speed may be added constantly to the operation position corresponding speed on the low-speed side, and a predetermined amount of speed may be subtracted constantly from the operation position corresponding speed on the high-speed side. As the predetermined amount to be added or subtracted, it may be possible to use a value which is changed and set by an artificial operation tool.

(1-4) A potentiometer for adjusting (not shown in the drawings) may be provided as a set ratio setter which can change and set the first set ratio and the second set ratio by an artificial operation. In such a case, the first set ratio and the second set ratio may be changed together, or may be changed separately.

(2) In the above embodiment, when the operation position corresponding speeds are different between right and left, the target speed is set by decreasing the speed with respect to the operation position corresponding speed on the high-speed side and increasing the speed with respect to the operation position corresponding speed on the low-speed side. However, instead of such a structure, it may be possible to increase the speed with respect to the operation position corresponding speed on the low-speed side without changing the operation position corresponding speed on the high-speed side. It may also be possible to decrease the speed with respect to the operation position corresponding speed on the high-speed side without changing the operation position corresponding speed on the low-speed side.

(3) In the above embodiment, as the variation characteristics of the operation positions and the operation position corresponding speeds, the following (3-1) and (3-2) are possible.

Figure 15:
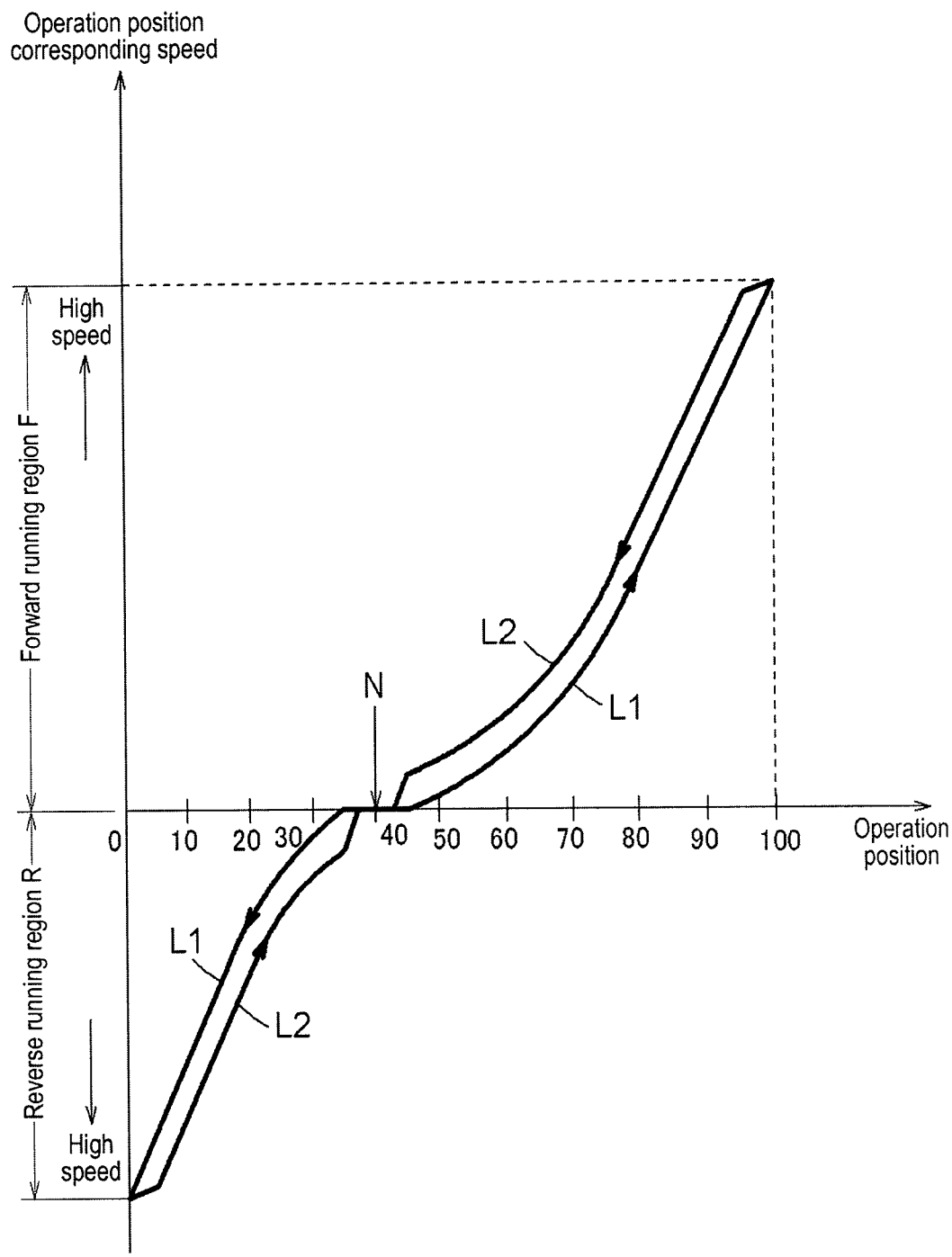
FIG. 15 is a graph showing variation characteristics of operation positions and operation position corresponding speeds according to an alternative embodiment.

(3-1) As shown in FIG. 15, a curved shape bulging downward is possible in the forward running region, and a curved shape bulging upward is possible in the rear running region. Specifically, it may be possible to adjust each of the first variation characteristic L1 applied when the operation positions of the running change speed levers 12R and 12L change on the speed-increasing side and the second variation characteristic L2 applied when the operation positions of the running change speed levers 12R and 12L change on the speed-decreasing side such that the variation ratio of the operation position corresponding speeds with respect to the variation of the operation positions becomes greater as the operation positions of the running change speed levers 12R and 12L become farther away from the dead zone region C toward the high-speed side in each of the normal rotation direction region (forward running region F) and the reverse rotation direction region (reverse running region R).

Figure 16:
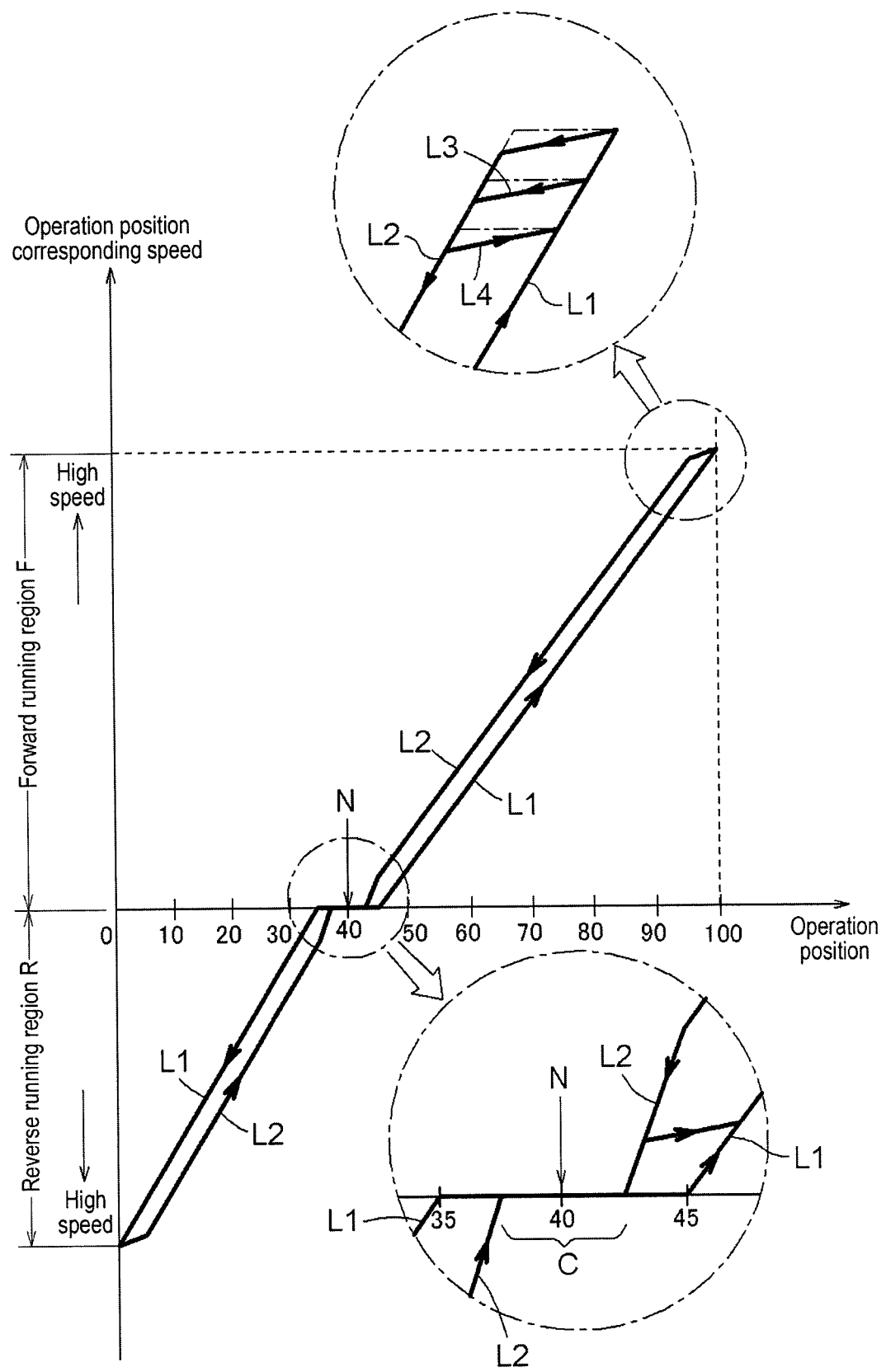
FIG. 16 is a graph showing variation characteristics of operation positions and operation position corresponding speeds according to an alternative embodiment.

(3-2) As shown in FIG. 16, the variation ratio of the operation position corresponding speeds with respect to the variation of the operation positions of the running change speed levers 12R and 12L is uniform in each of the normal rotation direction region (forward running region F) and the reverse rotation direction region (reverse running region R) in a region except for a region close to the dead zone region C. However, as shown in the partially enlarged view of FIG. 16, although the first variation characteristic L1 varies linearly in the vicinity of the dead zone region C, the second variation characteristic L2 may be bent and brought closer to the first variation characteristic L1 so as to reduce the distance between the first variation characteristic L1 and the second variation characteristic L2 in the horizontal axis direction. With this, it is possible to switch from the speed-decreasing operation to the speed-increasing operation as quickly as possible even when staggering occurs in the neutral position N caused by assembly error of the running change speed levers 12R and 12L.

(4) In the above embodiment, the mower 4 is supported between the front wheels 1 and the rear wheels 2. However, the mower 4 may be supported in the front portion of the running machine body 3 (in front of the front wheels 1). Also, the mower 4 is not limited to a side discharge type, but may be a rear discharge type in which cut lawn is discharged from the right and left center portion of the mower 4 toward the rear portion of the machine body. Further, the mower 4 is not limited to one which is provided with three rotation cutting edges 8a, 8b, and 8c, but may be provided with one, two, four or more rotation cutting edges.

(5) In the above embodiment, a mower is shown as an example of a work vehicle. The present invention, however, is not limited to a mower and can be applied to another type of work vehicle.

The present invention can be applied to a work vehicle in which right and left running wheels are operated by a pair of right and left change speed operation tools which can be independently and manually operated, and the right and left running wheels can be run and driven by a pair of electric motors independently.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
a pair of electric motors independently running and driving right and left running wheels in a state of being able to cause a straight running state and a turning running state;
a pair of right and left change speed operation tools that are independently manually operated and perform a change speed operation to the right and left running wheels;
a pair of change speed operation position detectors that detect operation positions of the respective change speed operation tools; and
a controller that control operation of the respective electric motors by setting target speeds with regard to the respective electric motors based on detection information of the respective change speed operation position detectors,
wherein the controller controls the operation of the respective electric motors by setting target speeds with regard to the respective electric motors such that the speed difference in the target speeds is smaller than the speed difference corresponding to the difference in the operation positions of the respective change speed operation tools by a set amount in a case where the operation positions of the respective change speed operation tools are different between the right and left operation tools.

2. The work vehicle according to claim 1, wherein the controller obtains operation position corresponding speeds corresponding to the operation positions detected by the change speed operation position detectors based on the operation positions detected by the change speed operation position detectors and variation characteristics between operation positions and operation position corresponding speeds determined in advance in a state where the operation position corresponding speed becomes greater as the operation position is operated on the speed-increasing side, and
when the operation position corresponding speeds are different between the right and left, in order to reduce the speed difference, the controller sets a value obtained by decreasing the operation position corresponding speed on the high-speed side by a set amount as the target speed and sets a value obtained by increasing the operation position corresponding speed on the low-speed side by a set amount as the target speed.

3. The work vehicle according to claim 2, wherein the controller sets an added value as the target speed with respect to the operation position corresponding speed on the high-speed side, the added value being obtained by adding a value in which the operation position corresponding speed on the high-speed side is multiplied by a first set ratio and a value in which the operation position corresponding speed on the low-speed side is multiplied by a second set ratio that is smaller than the first set ratio, and the controller sets another added value as the target speed with respect to the operation position corresponding speed on the low-speed side, the other added value being obtained by adding a value in which the operation position corresponding speed on the low-speed side is multiplied by the first set ratio and a value in which the operation position corresponding speed on the high-speed side is multiplied by the second set ratio.

4. The work vehicle according to claim 3, further comprising a set ratio setter to artificially change and set the first set ratio and the second set ratio.

5. The work vehicle according to claim 3, wherein the controller changes and sets the first set ratio and the second set ratio in accordance with change in the running speed so as to decrease the first set ratio and increase the second set ratio as the running speed becomes high.

6. The work vehicle according to claim 3, wherein the first set ratio is 70-85% and the second set ratio is 15-30%.

7. The work vehicle according to claim 3, wherein the target speed for a respective motor of the pair of electric motors is determined based upon the operation position of a corresponding change speed operation tool of the pair of right and left change speed operation tools, and a respective ratio of one of the first set ratio and the second set ratio of the operation position of the other change speed operation tool of the pair of right and left change speed operation tools.

8. The work vehicle according to claim 2, wherein when one of the pair of right and left change speed operation tools is operated in an operation position to command stop and the other of the pair of right and left change speed operation tool is operated in an operation position to command a predetermined operation position corresponding speed, the electric motor corresponding to the one of the pair of right and left change speed operation tool is driven at a lower speed than the operation position corresponding speed commanded by the other of the pair of right and left change speed operation tool in spite of commanding stop.

9. The work vehicle according to claim 1, wherein the controller controls the operation of the respective electric motors to set the target speeds during turning running operation and straight running operation.

* * * * *